United States Patent
Lee et al.

(10) Patent No.: US 12,407,939 B2
(45) Date of Patent: Sep. 2, 2025

(54) METHOD OF OPERATING IMAGE SENSOR AND IMAGE DEVICE PERFORMING THE SAME

(71) Applicant: Samsung Electronics Co., Ltd., Suwon-si (KR)

(72) Inventors: Yongchul Lee, Suwon-si (KR); Jaeseong Yu, Suwon-si (KR); Jisu Han, Suwon-si (KR); Sangwoo Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 207 days.

(21) Appl. No.: 18/455,047

(22) Filed: Aug. 24, 2023

(65) Prior Publication Data
US 2024/0098375 A1  Mar. 21, 2024

(30) Foreign Application Priority Data

Sep. 15, 2022  (KR) .................. 10-2022-0116674
Jan. 19, 2023  (KR) .................. 10-2023-0008301

(51) Int. Cl.
*H04N 23/741* (2023.01)
*H04N 23/71* (2023.01)
*H04N 23/73* (2023.01)

(52) U.S. Cl.
CPC ........... *H04N 23/741* (2023.01); *H04N 23/73* (2023.01)

(58) Field of Classification Search
None
See application file for complete search history.

(56) References Cited

U.S. PATENT DOCUMENTS

| | | |
|---|---|---|
| 6,879,731 B2 | 4/2005 | Kang et al. |
| 7,609,320 B2 | 10/2009 | Okamura |
| 8,040,411 B2 | 10/2011 | Nakajima et al. |
| 8,189,069 B2 | 5/2012 | Ogawa |
| 8,477,212 B2 | 7/2013 | Oyabu et al. |
| 8,699,822 B2 | 4/2014 | Park et al. |
| 8,890,975 B2 | 11/2014 | Baba et al. |
| 9,407,832 B2 | 8/2016 | Peng |

(Continued)

FOREIGN PATENT DOCUMENTS

KR        101616874 B1    5/2016

*Primary Examiner* — Ahmed A Berhan
(74) *Attorney, Agent, or Firm* — Harness, Dickey & Pierce, P.L.C.

(57) ABSTRACT

An operating method of an image sensor may include generating first result image data based on performing first image capturing. The first result image data may include a plurality of first standard dynamic range (SDR) image data and first high dynamic range (HDR) image data. The operating method may include generating first parameters based on the first result image data. The first parameters may be associated with the first image capturing and may include a plurality of first exposure times and a plurality of first sensor gains. The operating method may include generating an adjustment factor based on the first parameters and generating second parameters based on adjusting the first parameters based on the adjustment factor. The second parameters may include a plurality of second exposure times and a plurality of second sensor gains. The operating method may include generating performing second image capturing based on the second parameters.

20 Claims, 22 Drawing Sheets

(56) References Cited

U.S. PATENT DOCUMENTS

| | | |
|---|---|---|
| 10,356,336 B2 * | 7/2019 | Robles-Kelly ......... H04N 23/71 |
| 10,721,412 B2 | 7/2020 | Douady et al. |
| 10,728,473 B2 | 7/2020 | Zhao |
| 11,412,154 B2 * | 8/2022 | McElvain ............ H04N 25/533 |
| 12,096,129 B2 * | 9/2024 | Xiao ...................... H04N 23/73 |

* cited by examiner

ILL_AF Table

| ILLUMINANCE_LEVEL | ADJ_FCT_RLS |
|---|---|
| IM_LV5 | RLS5 |
| IM_LV4 | RLS4 |
| IM_LV3 | RLS3 |
| IM_LV2 | RLS2 |
| IM_LV1 | RLS1 |

FIG. 17A

| DRC_R1 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| LE_PARAM1 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |
| ME_PARAM1 | 100.00 | 70.71 | 57.74 | 50.00 | 44.72 | 40.82 | 37.80 | 35.36 | 33.33 | 31.62 | 30.15 | 28.87 | 27.74 | 26.73 | 25.82 | 25.00 |
| SE_PARAM1 | 100.00 | 50.00 | 33.33 | 25.00 | 20.00 | 16.67 | 14.29 | 12.50 | 11.11 | 10.00 | 9.09 | 8.33 | 7.69 | 7.14 | 6.67 | 6.25 |
| LE_PARAM2 | 100.00 | 70.71 | 57.74 | 50.00 | 44.72 | 40.82 | 37.80 | 35.36 | 33.33 | 31.62 | 30.15 | 28.87 | 27.74 | 26.73 | 25.82 | 25.00 |
| ME_PARAM2 | 100.00 | 50.00 | 33.33 | 25.00 | 20.00 | 16.67 | 14.29 | 12.50 | 11.11 | 10.00 | 9.09 | 8.33 | 7.69 | 7.14 | 6.67 | 6.25 |
| SE_PARAM2 | 100.00 | 35.36 | 19.25 | 12.50 | 8.94 | 6.80 | 5.40 | 4.42 | 3.70 | 3.16 | 2.74 | 2.41 | 2.13 | 1.91 | 1.72 | 1.56 |

FIG. 17B

| DRC_R1 | 1.00 | 2.00 | 3.00 | 4.00 | 5.00 | 6.00 | 7.00 | 8.00 | 9.00 | 10.00 | 11.00 | 12.00 | 13.00 | 14.00 | 15.00 | 16.00 |
|---|---|---|---|---|---|---|---|---|---|---|---|---|---|---|---|---|
| DRC_R2 | 1.00 | 2.83 | 5.20 | 8.00 | 11.18 | 14.70 | 18.52 | 22.63 | 27.00 | 31.62 | 36.48 | 41.57 | 46.87 | 52.38 | 58.09 | 64.00 |

FIG. 18A

| DRC_R1 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| LE_PARAM1 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |
| ME_PARAM1 | 100.00 | 70.71 | 57.74 | 50.00 | 44.72 | 40.82 | 37.80 | 35.36 | 33.33 | 31.62 | 30.15 | 28.87 | 27.74 | 26.73 | 25.82 | 25.00 |
| SE_PARAM1 | 100.00 | 50.00 | 33.33 | 25.00 | 20.00 | 16.67 | 14.29 | 12.50 | 11.11 | 10.00 | 9.09 | 8.33 | 7.69 | 7.14 | 6.67 | 6.25 |
| LE_PARAM2 | 100.00 | 90.62 | 84.53 | 80.00 | 76.39 | 73.40 | 70.85 | 68.63 | 66.67 | 64.91 | 63.32 | 61.88 | 60.56 | 59.33 | 58.20 | 57.14 |
| ME_PARAM2 | 100.00 | 64.08 | 48.80 | 40.00 | 34.16 | 29.97 | 26.78 | 24.26 | 22.22 | 20.53 | 19.09 | 17.86 | 16.79 | 15.86 | 15.03 | 14.29 |
| SE_PARAM2 | 100.00 | 45.31 | 28.18 | 20.00 | 15.28 | 12.23 | 10.12 | 8.58 | 7.41 | 6.49 | 5.76 | 5.16 | 4.66 | 4.24 | 3.88 | 3.57 |

FIG. 18B

| DRC_R1 | 1.00 | 2.00 | 3.00 | 4.00 | 5.00 | 6.00 | 7.00 | 8.00 | 9.00 | 10.00 | 11.00 | 12.00 | 13.00 | 14.00 | 15.00 | 16.00 |
|---|---|---|---|---|---|---|---|---|---|---|---|---|---|---|---|---|
| DRC_R2 | 1.00 | 2.21 | 3.55 | 5.00 | 6.55 | 8.17 | 9.88 | 11.66 | 13.50 | 15.41 | 17.37 | 19.39 | 21.47 | 23.60 | 25.77 | 28.00 |

FIG. 19A

| DRC_R1 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| LE_PARAM1 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |
| ME_PARAM1 | 100.00 | 70.71 | 57.74 | 50.00 | 44.72 | 40.82 | 37.80 | 35.36 | 33.33 | 31.62 | 30.15 | 28.87 | 27.74 | 26.73 | 25.82 | 25.00 |
| SE_PARAM1 | 100.00 | 50.00 | 33.33 | 25.00 | 20.00 | 16.67 | 14.29 | 12.50 | 11.11 | 10.00 | 9.09 | 8.33 | 7.69 | 7.14 | 6.67 | 6.25 |
| LE_PARAM2 | 100.00 | 95.08 | 91.62 | 88.89 | 86.62 | 84.66 | 82.94 | 81.40 | 80.00 | 78.72 | 77.54 | 76.45 | 75.43 | 74.48 | 73.58 | 72.23 |
| ME_PARAM2 | 100.00 | 67.23 | 52.89 | 44.44 | 38.74 | 34.56 | 31.35 | 28.78 | 26.67 | 24.89 | 23.38 | 22.07 | 20.92 | 19.90 | 19.00 | 18.18 |
| SE_PARAM2 | 100.00 | 47.54 | 30.54 | 22.22 | 17.32 | 14.11 | 11.85 | 10.17 | 8.89 | 7.87 | 7.05 | 6.37 | 5.80 | 5.32 | 4.91 | 4.55 |

FIG. 19B

| DRC_R1 | 1.00 | 2.00 | 3.00 | 4.00 | 5.00 | 6.00 | 7.00 | 8.00 | 9.00 | 10.00 | 11.00 | 12.00 | 13.00 | 14.00 | 15.00 | 16.00 |
|---|---|---|---|---|---|---|---|---|---|---|---|---|---|---|---|---|
| DRC_R2 | 1.00 | 2.10 | 3.027 | 4.50 | 5.77 | 7.09 | 8.44 | 9.83 | 11.25 | 12.70 | 14.19 | 15.70 | 17.23 | 18.80 | 20.39 | 22.00 |

METHOD OF OPERATING IMAGE SENSOR AND IMAGE DEVICE PERFORMING THE SAME

CROSS-REFERENCE TO RELATED APPLICATIONS

This application claims priority under 35 U.S.C. § 119 to Korean Patent Application No. 10-2022-0116674, filed on Sep. 15, 2022 in the Korean Intellectual Property Office, and Korean Patent Application No. 10-2023-0008301, filed on Jan. 19, 2023 in the Korean Intellectual Property Office, the disclosures of each of which are incorporated by reference herein in their entireties.

BACKGROUND

Example embodiments of the present inventive concepts described herein relate to semiconductor devices, and more particularly, relate to operating methods of image sensors and image devices performing the operating methods.

An image sensor converts a light incident through a camera lens into digital image data. For the high dynamic range (HDR), the image sensor may generate a plurality of standard dynamic range (SDR) image data having different average brightness and may generate HDR image data based on the plurality of SDR image data.

The plurality of SDR image data may be obtained by applying different exposure times and/or different sensor gains with respect to one object. However, in a backlit environment, a range between the exposure times and/or the sensor gains may deviate from a hardware constraint of the image sensor for obtaining the HDR image data. In this case, due to the hardware constraint, SDR image data having the lowest average brightness from among the plurality of SDR image data may be captured to be brighter than an unintended level, making it difficult to secure a sufficient dynamic range in the HDR image data.

SUMMARY

Some example embodiments of the present inventive concepts provide an operating method of an image sensor generating a high dynamic range (HDR) image data.

Some example embodiments of the present inventive concepts provide an operating method of an image sensor generating HDR image data in a backlit environment.

Some example embodiments of the present inventive concepts provide an image sensor configured to perform the operating method.

According to some example embodiments, an operating method of an image sensor may include generating first result image data based on performing first image capturing. The first result image data may include a plurality of first standard dynamic range (SDR) image data and first high dynamic range (HDR) image data. The operating method may include generating first parameters based on the first result image data. The first parameters may be associated with the first image capturing and may include a plurality of first exposure times and a plurality of first sensor gains. The operating method may include generating an adjustment factor based on the first parameters. The operating method may include generating second parameters based on adjusting the first parameters based on the adjustment factor. The second parameters may include a plurality of second exposure times and a plurality of second sensor gains. The operating method may include performing second image capturing based on the second parameters.

According to some example embodiments, an image device may include an application processor and an image sensor. The application processor may be configured to generate first parameters, which are associated with first image capturing and include a plurality of first exposure times and a plurality of first sensor gains, based on first result image data including a plurality of first standard dynamic range (SDR) image data and first high dynamic range (HDR) image data. The application processor may be configured to generate an adjustment factor based on the first parameters. The application processor may be configured to generate second parameters including a plurality of second exposure times and a plurality of second sensor gains based on adjusting the first parameters based on the adjustment factor. The image sensor may be configured to perform the first image capturing and to perform second image capturing based on the second parameters.

According to some example embodiments, an operating method of an image sensor may include generating first result image data including a plurality of first standard dynamic range (SDR) image data and first high dynamic range (HDR) image data based on performing first image capturing. The operating method may include generating first parameters, which are associated with the first image capturing and include a first long exposure parameter and a first short exposure parameter, based on the first result image data. The operating method may include generating an adjustment factor based on the first parameters. The operating method may include generating second parameters including a second long exposure parameter and a second short exposure parameter are generated based on adjusting the first parameters based on the adjustment factor. The operating method may include performing second image capturing based on the second parameters. A ratio of the second long exposure parameter to the second short exposure parameter may be calculated to satisfy a hardware constraint of the image sensor for obtaining HDR image data.

BRIEF DESCRIPTION OF THE DRAWINGS

The above and other objects and features of the present inventive concepts will become apparent by describing in detail some example embodiments thereof with reference to the accompanying drawings.

FIGS. 17A, 17B, 18A, 18B, 19A, and 19B are diagrams for describing first parameters, second parameters, a first dynamic range compression ratio, and a second dynamic range compression ratio of FIG. 1 according to some example embodiments of the present inventive concepts.

DETAILED DESCRIPTION

Below, some example embodiments of the present inventive concepts will be described in detail and clearly to such an extent that one skilled in the art easily carries out the present inventive concepts.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Figure 1:
FIG. 1 is a flowchart illustrating an operating method of an image sensor according to some example embodiments of the present inventive concepts.
Figure 2:
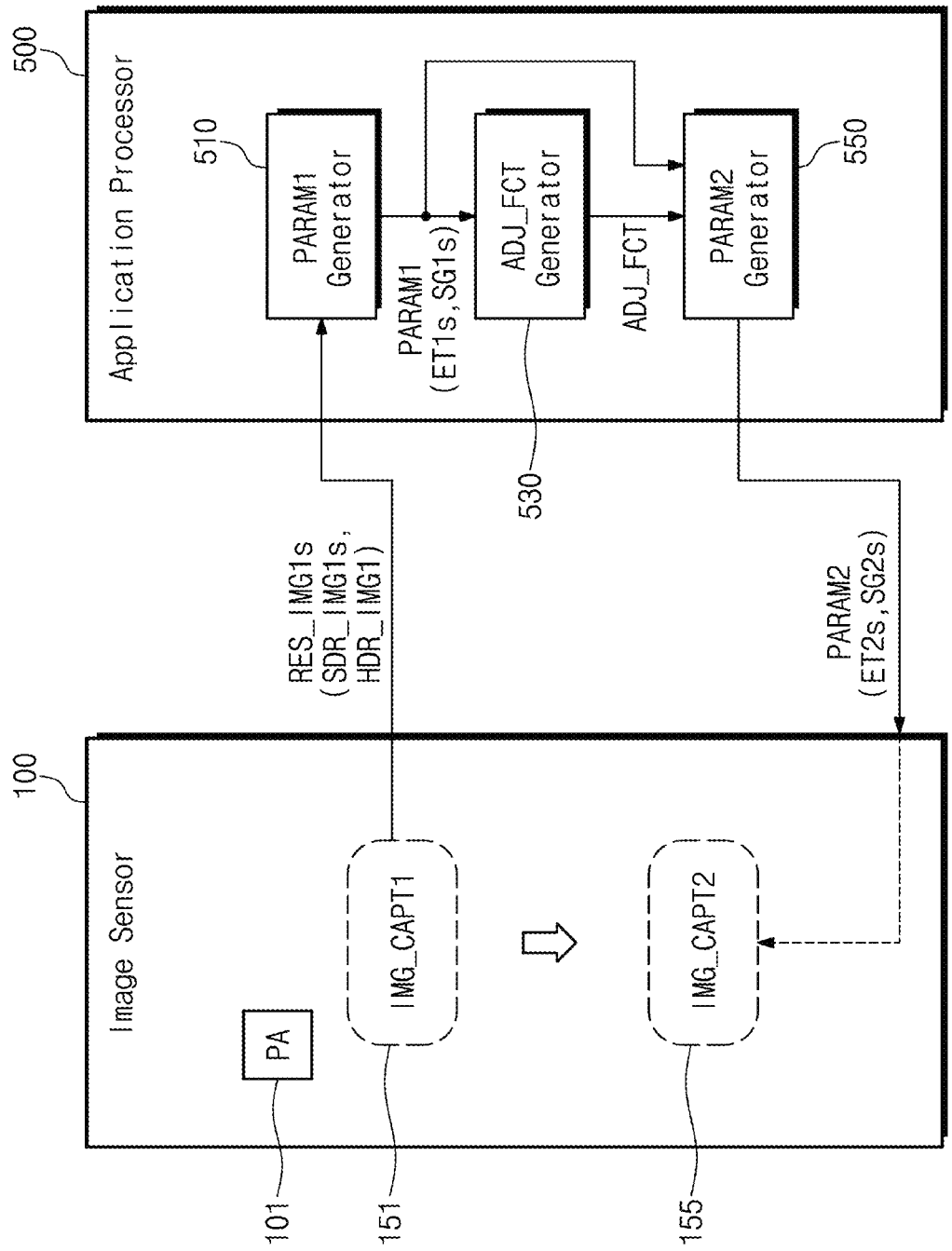
FIG. 2 is a block diagram illustrating an image device according to some example embodiments of the present inventive concepts.

FIG. 1 is a flowchart illustrating an operating method of an image sensor according to some example embodiments of the present inventive concepts. FIG. 2 is a block diagram illustrating an image device according to some example embodiments of the present inventive concepts.

Referring to FIGS. 1 and 2, in the operating method of an image sensor 100, and/or an image device including same, according to some example embodiments of the present inventive concepts, the image sensor 100 may perform first image capturing 151 (e.g., generating one or more first images) to generate a plurality of first result image data RES_IMG1s (also referred to herein interchangeably as first images) including a plurality of first standard dynamic range (SDR) image data SDR_IMG1s (also referred to herein interchangeably as first SDR images) and first high dynamic range (HDR) image data HDR_IMG1 (S100) (also referred to herein interchangeably as first HDR images).

In some example embodiments, an image device 10 may refer to a high-resolution image device that captures a plurality of SDR image data sequentially or simultaneously and generates HDR image data based on the plurality of SDR image data. The image device 10 may include the image sensor 100 and an application processor 500. The image sensor 100 may include a pixel array 101, and the application processor 500 may include a first parameter generator 510, an adjustment factor generator 530, and a second parameter generator 550.

In some example embodiments, the image sensor 100 may perform the first image capturing 151 and second image capturing 155 such that the first image capturing 151 and second image capturing 155 are continuous image capturing operations. For example, the image sensor 100 may perform the first image capturing 151 and may then perform the second image capturing 155 (e.g., subsequent to performing the first image capturing 151). For example, when the image device 10 operates in a video mode, the image device 10 may perform the first and second image capturing 151 and 155 and may capture continuous frames to generate the first images and/or the second images; when the image device 10 operates in a still image mode, the image device 10 may perform the first image capturing 151 and may capture (e.g., generate) a preview image.

In some example embodiments, the pixel array 101 may include a plurality of unit pixels. The image sensor 100 may generate a plurality of result image data including a plurality of SDR image data and one HDR image data for each of the first and second image capturing 151 and 155, by using the pixel array 101. For example, the image sensor 100 may perform the first image capturing 151 and may generate the plurality of first result image data RES_IMG1s including the plurality of first SDR image data SDR_IMG1s and the first HDR image data HDR_IMG1; the image sensor 100 may perform the second image capturing 155 and may generate a plurality of second result image data (also referred to herein interchangeably as second images) including a plurality of second SDR image data (also referred to herein interchangeably as second SDR images) and second HDR image data (also referred to herein interchangeably as second HDR images). The unit pixel will be described with reference to FIGS. 3A and 3B.

In some example embodiments, the image sensor 100 may generate the HDR image data based on the plurality of SDR image data. For example, the image sensor 100 may generate merged image data by merging the plurality of SDR image data and may generate the HDR image data by sequentially performing segmentation and tone mapping on the merged image data. This is only an example.

The application processor 500 may generate first parameters PARAM1 based on the first result image data RES_IMG1s (e.g., based on the first images) (S200).

In some example embodiments, the first parameters PARAM1 may be associated with the first image capturing 151, may include a plurality of first exposure times ET1s and a plurality of first sensor gains SG1s, and may further include a first long exposure parameter, a first medium exposure parameter, and a first short exposure parameter.

In some example embodiments, the plurality of first exposure times ET1s may include setting times, and the plurality of first sensor gains SG1s may include setting gains. Each of the first long exposure parameter, the first medium exposure parameter, and the first short exposure parameter may be obtained by multiplying one of the setting times and one of the setting gains together. For example, the first long exposure parameter may be obtained by multiplying the longest setting time among the setting times and the greatest setting gain among the setting gains together, and the first short exposure parameter may be obtained by multiplying the shortest setting time among the setting times and the smallest setting gain among the setting gains together. This is only an example. In some example embodiments, to adjust a target ratio between the first long exposure parameter and the first short exposure parameter, setting times for individually obtaining the first long exposure parameter and the first short exposure parameter may be first adjusted; when the target ratio is not implemented in spite of the adjustment of the setting times, the setting gains for individually obtaining the first long exposure parameter and the first short exposure parameter may be then adjusted. In some example embodiments, the setting gains may be set to "1" by default.

The first parameters PARAM1 will be described with reference to FIGS. 4, 5A, and 5B.

The application processor 500 may generate an adjustment factor ADJ_FCT based on the first parameters PARAM1 (S300).

In some example embodiments, the application processor 500 may generate pieces of information about the plurality of first SDR image data SDR_IMG1s or the first HDR image data HDR_IMG1 based on some of the plurality of first exposure times ET1s and some of the plurality of first sensor gains SG1s and may generate the adjustment factor ADJ_FCT based on the pieces of information. For example, the application processor 500 may calculate a first dynamic range compression ratio and a first illuminance level based on some of the plurality of first exposure times ET1s and some of the plurality of first sensor gains SG1s (e.g., based on the first long exposure parameter and the first short exposure parameter) and may calculate the adjustment factor ADJ_FCT based on the first dynamic range compression ratio, the first illuminance level, and a first adjustment factor relation.

In some example embodiments, the application processor 500 may call (e.g., access) the first adjustment factor relation from an illuminance level-adjustment factor table (e.g., which may be stored at a memory of the image device 10, which may be a memory, memory device, or the like of any device and/or system of any of the example embodiments, for example memory device 720 of computing device 700) based on the first illuminance level. The adjustment factor ADJ_FCT will be described with reference to FIGS. 6, 7, 8, and 9.

The application processor 500 may generate second parameters PARAM2 by adjusting the first parameters PARAM1 based on the adjustment factor ADJ_FCT (S400).

In some example embodiments, the second parameters PARAM2 may be associated with the second image capturing 155, may include a plurality of second exposure times ET2s and a plurality of second sensor gains SG2s, and may further include a second long exposure parameter, a second medium exposure parameter, and a second short exposure parameter.

In some example embodiments, the plurality of second exposure times ET2s may include setting times, and the plurality of second sensor gains SG2s may include setting gains. Each of the second long exposure parameter, the second medium exposure parameter, and the second short exposure parameter may be obtained by multiplying one of the setting times and one of the setting gains together. The second parameters PARAM2 will be described with reference to FIGS. 10A, 10B, and 11.

The image sensor 100 may perform the second image capturing 155 based on the second parameters PARAM2 (S500), which may include generating second images.

In some example embodiments, the first long exposure parameter, the first medium exposure parameter, and the first short exposure parameter may indicate parameters applied (or estimated as applied) to individually generate the plurality of first SDR image data SDR_IMG1s included in the plurality of first result image data RES_IMG1s. For example, SDR image data having the greatest average brightness value from among the plurality of first SDR image data SDR_IMG1s may be estimated as being generated by applying the first long exposure parameter; SDR image data having the smallest average brightness value from among the plurality of first SDR image data SDR_IMG1s may be estimated as being generated by applying the first short exposure parameter; SDR image data having a medium average brightness value from among the plurality of first SDR image data SDR_IMG1s may be estimated as being generated by applying the first medium exposure parameter. The second long exposure parameter, the second medium exposure parameter, and the second short exposure parameter may have the same or similar relationships with the first long exposure parameter, the first medium exposure parameter, and the first short exposure parameter; however, the image sensor 100 may directly apply the second long exposure parameter, the second medium exposure parameter, and the second short exposure parameter to perform the second image capturing 155.

A sharp change of an ambient environment may occur in the process where the image device captures an object (e.g., generates an image of the object). For example, the ambient environment of the image device 10 may change from the normal environment to the backlit environment. In this case, the image device 10 may increase the long exposure parameter to a maximum value such that a dark region in image data due to the backlit environment becomes brighter. For example, the image device 10 may increase the longest exposure time among the exposure times and/or the greatest sensor gain among the sensor gains so as to be set to a maximum value.

However, as described above, in the case of increasing the long exposure parameter to the maximum value, the short exposure parameter may also be increased to a given level or more. This may be associated with a hardware constraint of an image sensor for obtaining HDR image data. For example, the hardware constraint may include a ratio of a maximum shutter speed and a minimum shutter speed of an electronic shutter for controlling each of the exposure times and the ability to remove a motion artifact capable of occurring in the process of merging a plurality of SDR image data. In this case, SDR image data having the lowest average brightness from among a plurality of SDR image data for obtaining HDR image data may be captured to be relatively bright compared to an intended level; in this case, because the merging, segmentation, and tone mapping processes for generating the HDR image data may not be performed normally, it is difficult to secure a sufficient dynamic range in the HDR image data.

In the operating method of the image sensor according to some example embodiments of the present inventive concepts, through the above configuration, second image capturing may be performed based on results of performing first image capturing. First parameters may be generated based on the results of performing the first image capturing, and second parameters for performing the second image capturing may be generated based on the first parameters. The second parameters may be calculated to satisfy the hardware constraint of the image device (or image sensor) for obtaining the HDR image data. Accordingly, even though the ambient environment changes from the normal environment to the backlit environment, the image device may obtain the HDR image data with the sufficient dynamic range by stabilizing a brightness value of an object in the image data and preventing a saturation of a background in the image data. Accordingly, an image sensor and/or image device including same that implements the operating method may generate improved HDR image data and thus may generate improved HDR images better satisfying (e.g., conforming to) hardware constraints of the image sensor, such that the HDR images have improved dynamic range and improved quality, such that the image sensor and/or image device including same that implements the operating method has improved HDR generating performance based on being able to maintain generation of high-quality HDR images satisfying the hardware constraints of the image sensor and/or image device and maintaining dynamic range (e.g., stabilizing brightness of an object in the HDR images and preventing saturation of the background in the HDR images) while accounting for (e.g., compensating for, accommodating, etc.) variations in the ambient environment (e.g., variations in ambient illuminance resulting from a sharp change of an ambient environment from normal to backlit).

Figure 3A:
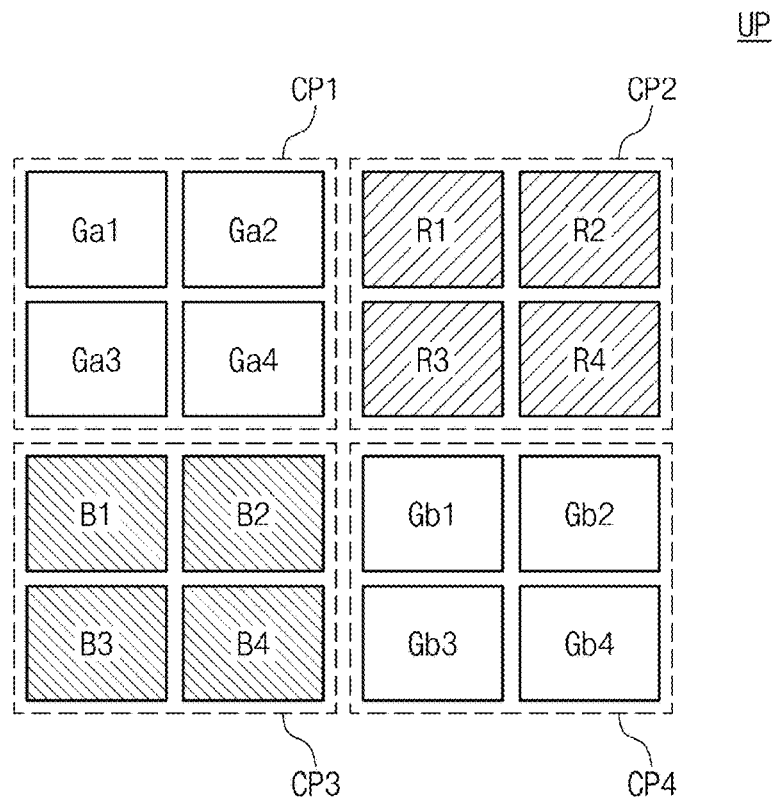
FIG. 3A is a diagram for describing a unit pixel included in a pixel array of FIG. 2 according to some example embodiments of the present inventive concepts.
Figure 3B:
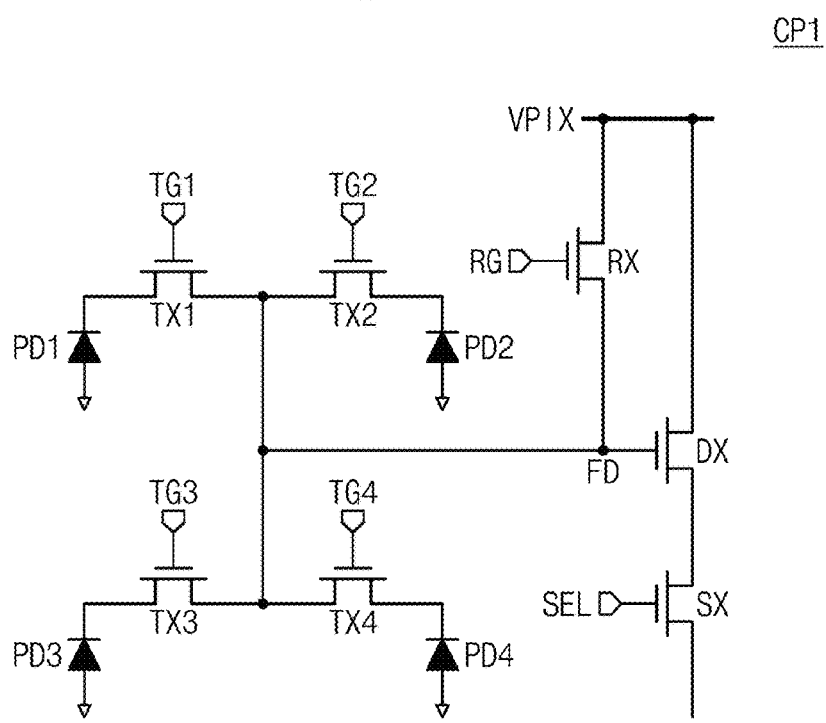
FIG. 3B is a circuit diagram illustrating an example of a unit color pixel included in the unit pixel according to some example embodiments of the present inventive concepts.

FIG. 3A is a diagram for describing a unit pixel included in a pixel array of FIG. 2 according to some example embodiments of the present inventive concepts, and FIG. 3B is a circuit diagram illustrating an example of a unit color pixel included in the unit pixel according to some example embodiments of the present inventive concepts.

Referring to FIGS. 2 and 3A, the pixel array 101 may include a plurality of unit pixels UP, each of which includes first to fourth unit color pixels CP1, CP2, CP3, and CP4 each corresponding to a specific color (e.g., configured to detect incident light having a wavelength within a wavelength band corresponding to a specific color) and including sub-pixels. For example, the first unit color pixel CP1 may include sub-pixels Ga1, Ga2, Ga3, and Ga4 corresponding to a green color, the second unit color pixel CP2 may include sub-pixels R1, R2, R3, and R4 corresponding to a red color, the third unit color pixel CP3 may include sub-pixels B1, B2, B3, and B4 corresponding to a blue color, and the fourth unit color pixel CP4 may include sub-pixels Gb1, Gb2, Gb3, and Gb4 corresponding to a green color.

In some example embodiments, sub-pixels corresponding to one color may output analog signals based on different exposure times. For example, with regard to the green color, the sub-pixel Ga1 may output an analog signal during the long exposure time, the sub-pixels Ga2 and Ga3 may output analog signals during the medium exposure time shorter than the long exposure time, and the sub-pixel Ga4 may output an analog signal during the short exposure time shorter than the medium exposure time. Sub-pixels corresponding to the red color, the blue color, and the other green color may also operate to be similar to those described above.

In some example embodiments, the analog signals output based on the different exposure times may be converted into a plurality of SDR image data based on different sensor gains including an analog gain and a digital gain. For example, the analog signals output from the sub-pixels Ga1, Ga2, Ga3, and Ga4 may pass through a correlated double sampling (CDS) circuit and an analog-to-digital converter (ADC) circuit and may additionally pass through an image signal processing circuit. Different sensor gains may be applied to the analog signals while passing through the CDS circuit, the ADC circuit, and the image signal processing circuit.

Referring to FIGS. 2, 3A, and 3B, the unit color pixel CP1 may include first to fourth photoelectric conversion elements PD1, PD2, PD3, and PD4, first to fourth transfer transistors TX1, TX2, TX3, and TX4, a reset transistor RX, a select transistor SX, and a drive transistor DX.

The first to fourth photoelectric conversion elements PD1 to PD4 may respectively correspond to the sub-pixels Ga1, Ga2, Ga3, and Ga4 and may generate and accumulate photoelectrons based on the intensity of incident light. For example, each of the first to fourth photoelectric conversion elements PD1 to PD4 may be implemented with one of a photo diode, a photo transistor, a photo gate, and a pinned photo diode (PPD), but this is only an example.

The first to fourth transfer transistors TX1 to TX4 may be respectively connected to the first to fourth photoelectric conversion elements PD1 to PD4 and may transfer the charges accumulated by the first to fourth photoelectric conversion elements PD1 to PD4 to a floating diffusion region PD based on control signals TG1, TG2, TG3, and TG4. The drive transistor DX may be connected to the floating diffusion region PD, the select transistor SX may be connected to the drive transistor DX, and the drive transistor DX and the select transistor SX may output the charges transferred to the floating diffusion region FD to a column line of the pixel array 101 based on the voltage level of the floating diffusion region FD and a control signal SEL. The reset transistor RX may be connected between a power supply voltage VPIX and the floating diffusion region FD and may reset the floating diffusion region FD based on a control signal RG.

In some example embodiments, the exposure times of the sub-pixels Ga1, Ga2, Ga3, and Ga4 may be adjusted by controlling turn-on and turn-off times of the first to fourth transfer transistors TX1 to TX4 based on control signals TG1, TG2, TG3, and TG4. For example, the exposure time of the sub-pixel Ga1 may start from a point in time when photoelectrons are accumulated by the first photoelectric conversion element PD1 by turning off the first transfer transistor TX1 and may end at a point in time when the accumulated photoelectrons are transferred to the floating diffusion region FD by turning on the first transfer transistor TX1.

Figure 4:
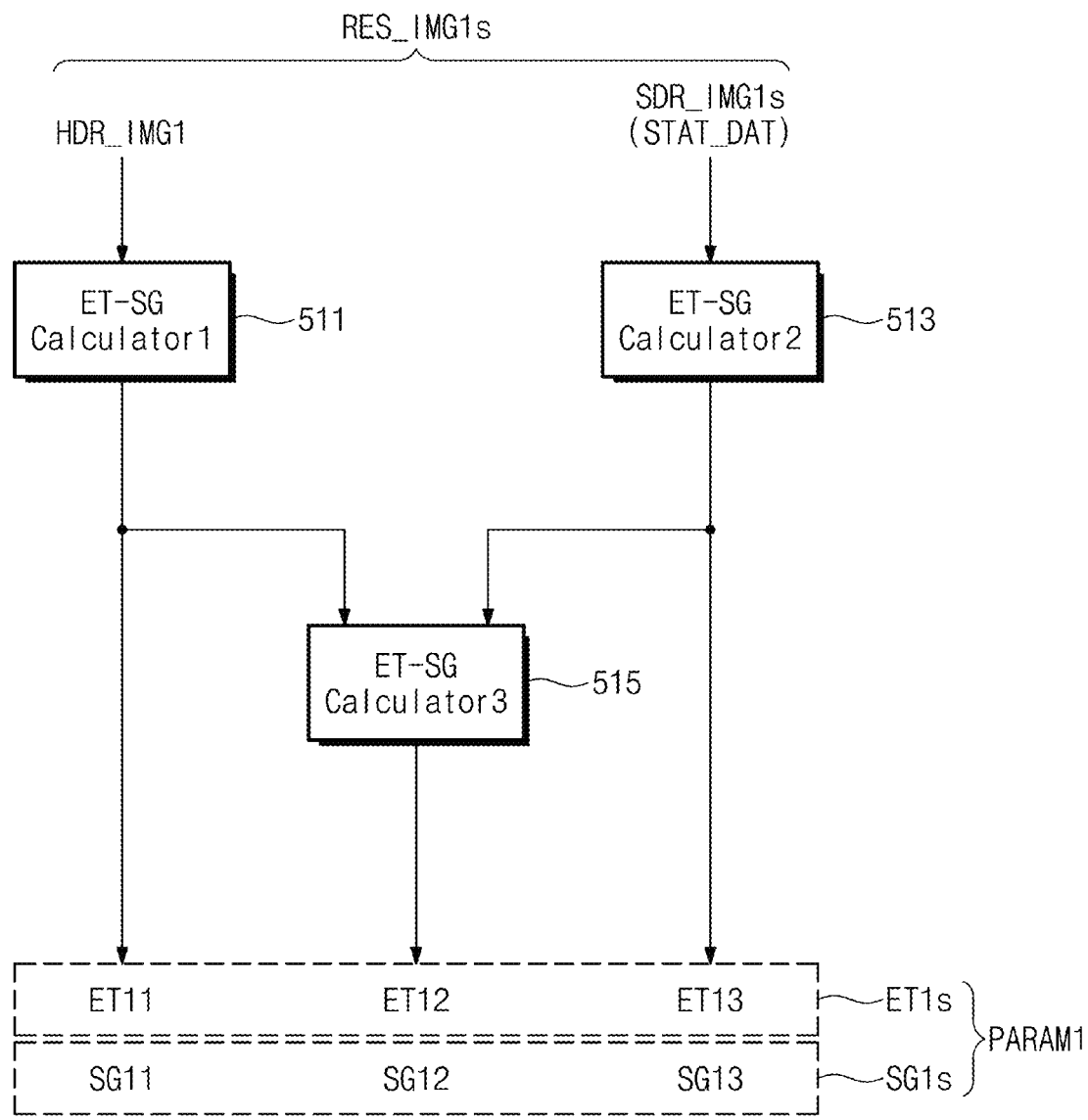
FIG. 4 is a block diagram illustrating some example embodiments of a first parameter generator of FIG. 2.

FIG. 4 is a block diagram illustrating some example embodiments of a first parameter generator of FIG. 2.

Referring to FIGS. 2 and 4, the first parameter generator 510 may include a first setting time and setting gain calculator 511, a second setting time and setting gain calculator 513, and a third setting time and setting gain calculator 515.

The first parameter generator 510 may be associated with the first image capturing and may receive the first result image data RES_IMG1s including the plurality of first SDR image data SDR_IMG1s and the first HDR image data HDR_IMG1. The first setting time and setting gain calculator 511 may calculate a setting time ET11 and a setting gain SG11 based on the first HDR image data HDR_IMG1, and the second setting time and setting gain calculator 513 may calculate a setting time ET13 and a setting gain SG13 based on some or all of the plurality of first SDR image data SDR_IMG1s, and the third setting time and setting gain calculator 515 may calculate a setting time ET12 and a setting gain SG12 based on the setting times ET11 and ET13 and the setting gains SG11 and SG13.

In some example embodiments, the first parameters PARAM1 may include the plurality of first exposure times ET1s and the plurality of first sensor gains SG1s, the plurality of first exposure times ET1s may include the setting times ET11, ET12, and ET13, and the plurality of first sensor gains SG1s may include the setting gains SG11, SG12, and SG13.

In some example embodiments, the setting time ET11 may correspond to an exposure time being the longest (e.g., a longest exposure time) from among the plurality of first exposure times ET1s, the setting time ET13 may correspond to an exposure time being the shortest (e.g., a shortest exposure time) from among the plurality of first exposure times ET1s, and the setting time ET12 may correspond to an exposure time having a value between the setting time ET11 and the setting time ET13 from among the plurality of first exposure times ET1s. The setting gains SG11, SG12, and SG13 may respectively correspond to the setting times ET11, ET12, and ET13.

In some example embodiments, the second setting time and setting gain calculator 513 may calculate the setting time ET13 and the setting gain SG13 only based on SDR image data having the lowest average brightness (i.e., being the darkest) from among the plurality of SDR image data SDR_IMGs. In some example embodiments, the second setting time and setting gain calculator 513 may calculate the setting time ET13 and the setting gain SG13 based on statistical data STAT_DAT provided from an image sensor (e.g., 100 of FIG. 2), instead of some or all of the plurality of first SDR image data SDR_IMG1s.

In some example embodiments, the first parameters PARAM1 may further include the first long exposure parameter, the first medium exposure parameter, and the first short exposure parameter. For example, the first long exposure parameter may be obtained by multiplying the setting time ET11 and the setting gain SG11 together, the first medium exposure parameter may be obtained by multiplying the setting time ET12 and the setting gain SG12 together, and the first short exposure parameter may be obtained by multiplying the setting time ET13 and the setting gain SG13 together. However, the present inventive concepts are not limited thereto.

Figure 5A:
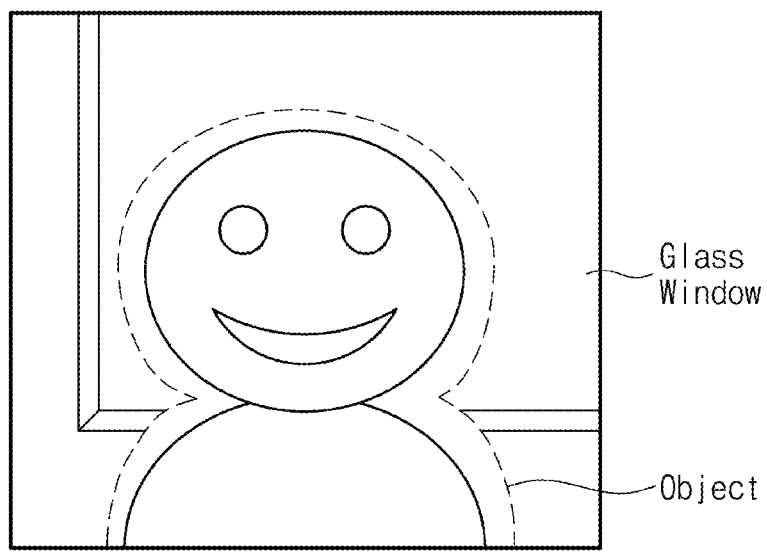
FIGS. 5A and 5B are diagrams for describing first parameters of FIG. 4 according to some example embodiments of the present inventive concepts.
Figure 5B:
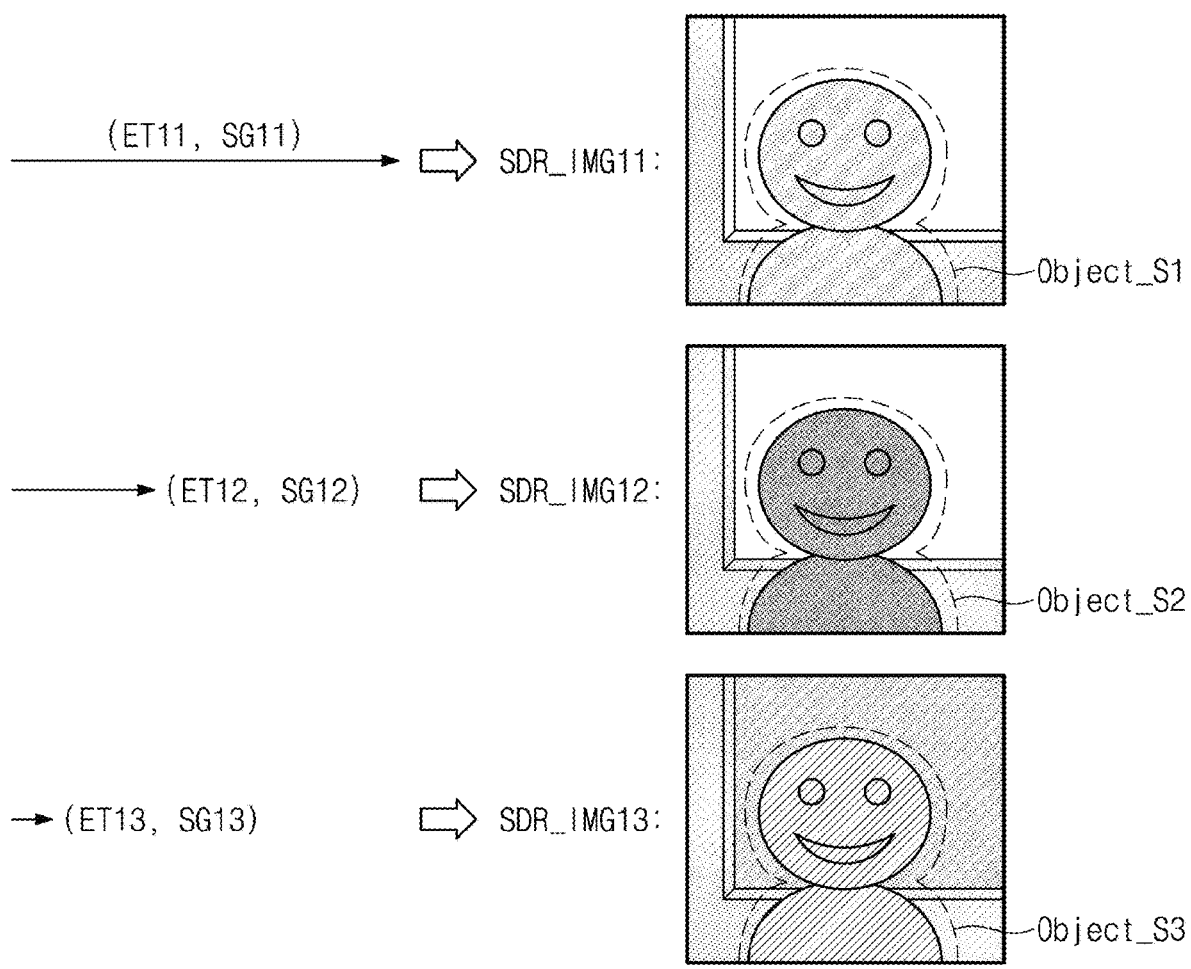

FIGS. 5A and 5B are diagrams for describing first parameters of FIG. 4 according to some example embodiments of the present inventive concepts.

Referring to FIGS. 2, 4, and 5A, an image device may generate the plurality of first SDR image data SDR_IMG1s by performing the first image capturing on an object standing indoors with the back to the window.

Referring to FIGS. 5A and 5B, the image device may generate the SDR image data SDR_IMG11 having the greatest average brightness value based on the setting time ET11 and the setting gain SG11, may generate the SDR image data SDR_IMG13 having the smallest average brightness value based on the setting time ET13 and the setting gain SG13, and may generate the SDR image data SDR_IMG12 having a medium average brightness value of the SDR image data SDR_IMG11 and SDR_IMG13 based on the setting time ET12 and the setting gain SG12.

In some example embodiments, as image data changes in the order of SDR_IMG11, SDR_IMG12, and SDR_IMG13, the brightness of objects Object_S1, Object_S2, and Object_S3 and backgrounds included in the SDR image data may become darker.

Figure 6:
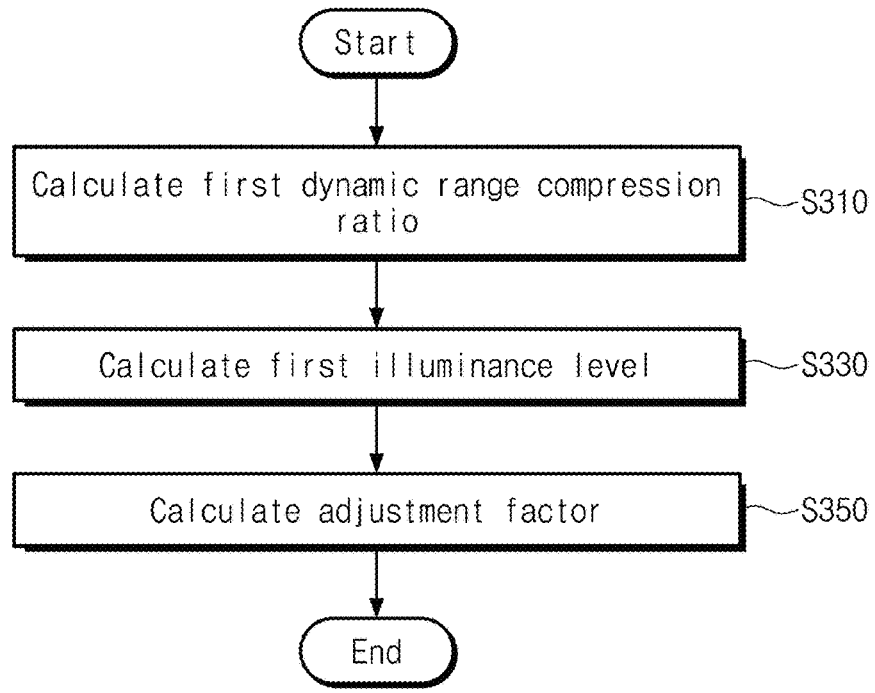
FIG. 6 is a flowchart illustrating some example embodiments of an operation of generating an adjustment factor of FIG. 1.

FIG. 6 is a flowchart illustrating some example embodiments of an operation of generating an adjustment factor of FIG. 1.

Referring to FIGS. 1, 2, and 6, in the generating of the adjustment factor ADJ_FCT (S300), the application processor 500 may calculate a first dynamic range compression ratio (S310).

In some example embodiments, the application processor 500 may calculate the first dynamic range compression ratio based on a first setting time and a second setting time among the plurality of first exposure times ET1s and a first setting gain and a second setting gain among the plurality of first sensor gains SG1s. For example, the application processor 500 may calculate the first dynamic range compression ratio by dividing a value (e.g., a first value) obtained by multiplying the first setting time and the first setting gain together by a value (e.g., a second value) obtained by multiplying the second setting time and the second setting gain together (e.g., based on dividing the first value by the second value). For example, the application processor 500 may calculate the first dynamic range compression ratio by dividing the first long exposure parameter by the first short exposure parameter.

In some example embodiments, the first setting time may correspond to an exposure time being the longest (e.g., a longest exposure time) from among the plurality of first exposure times ET1s, the second setting time may correspond to an exposure time being the shortest (e.g., a shortest exposure time) from among the plurality of first exposure times ET1s, the first setting gain may correspond to the first setting time, and the second setting gain may correspond to the second setting time.

The application processor 500 may calculate a first illuminance level (S330). In some example embodiments, the application processor 500 may calculate the first illuminance level based on the first setting time and the first setting gain. For example, the application processor 500 may calculate the first illuminance level based on the first long exposure parameter.

The application processor 500 may calculate the adjustment factor ADJ_FCT based on the first dynamic range compression ratio, the first illuminance level, and the first adjustment factor relation (S350).

Figure 7:
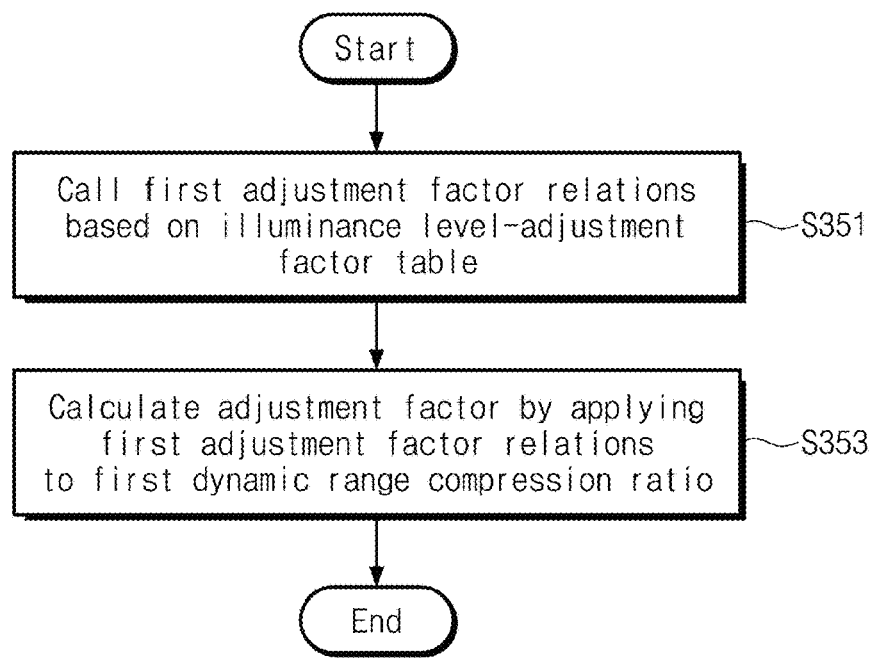
FIG. 7 is a flowchart illustrating some example embodiments of an operation of calculating an adjustment factor of FIG. 6.

FIG. 7 is a flowchart illustrating some example embodiments of an operation of calculating an adjustment factor of FIG. 6.

Referring to FIGS. 1, 2, 6, and 7, in the calculating of the adjustment factor ADJ_FCT (S350), the application processor 500 may call the first adjustment factor relation corresponding to the first illuminance level based on an illuminance level-adjustment factor table (S351), for example based on accessing the first adjustment factor relation from the illuminance level-adjustment factor table stored in a memory, memory device, or the like of any device and/or system of any of the example embodiments. The illuminance level-adjustment factor table will be described with reference to FIG. 9.

The application processor 500 may calculate the adjustment factor ADJ_FCT by applying the first adjustment factor relation to the first dynamic range compression ratio (S353).

In some example embodiments, as the first dynamic range compression ratio increases, the magnitude of the adjustment factor ADJ_FCT may increase.

Figures 8, 9:
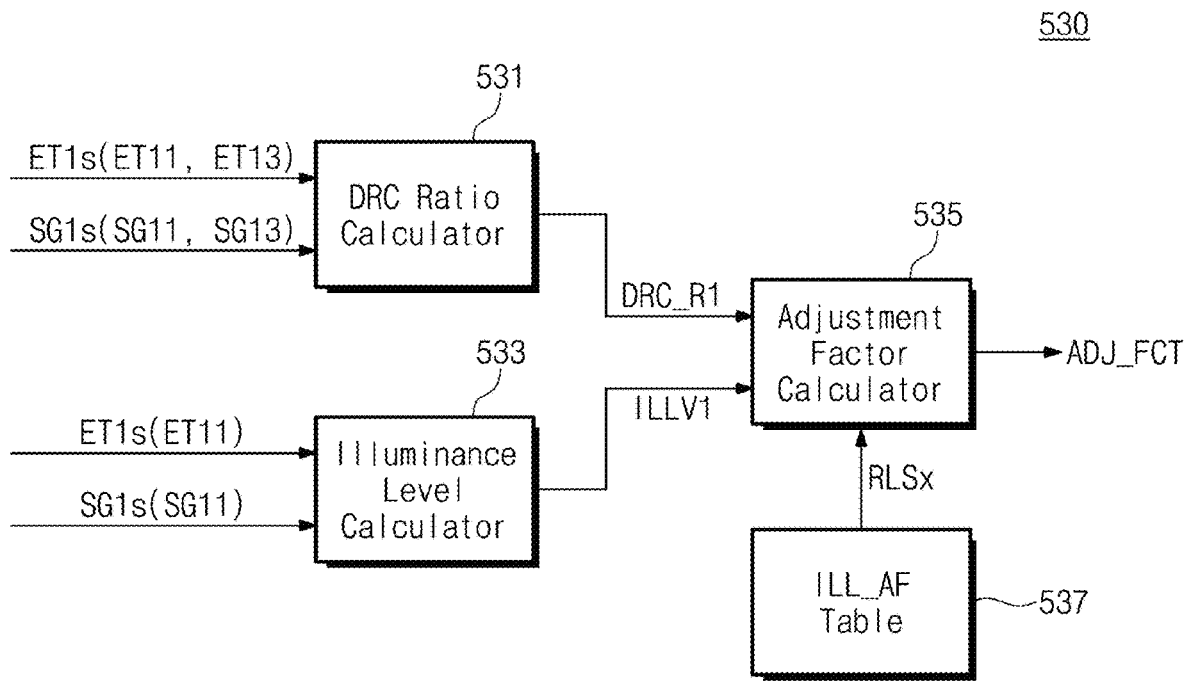
FIG. 8 is a block diagram illustrating some example embodiments of an adjustment factor generator of FIG. 2.
FIG. 9 is a diagram illustrating some example embodiments of an illuminance level-adjustment factor table of FIG. 8.

FIG. 8 is a block diagram illustrating some example embodiments of an adjustment factor generator of FIG. 2.

Referring to FIGS. 2, 6, 7, and 8, the adjustment factor generator 530 may include a dynamic range compression ratio calculator 531, an illuminance level calculator 533, an adjustment factor calculator 535, and an illuminance level-adjustment factor table 537. The adjustment factor generator 530 may perform operation S300, operation S310, operation S330, operation S350, operation S351, and operation S353 of FIGS. 2, 6, and 7.

The dynamic range compression ratio calculator 531 may calculate a first dynamic range compression ratio DRC_R1 based on the setting times ET11 and ET13 among the plurality of first exposure times ET1s and the setting gains SG11 and SG13 among the plurality of first sensor gains SG1s.

The illuminance level calculator 533 may calculate a first illuminance level ILLV1 based on the setting time ET11 among the plurality of first exposure times ET1s and the setting gain SG11 among the plurality of first sensor gains SG1s.

The adjustment factor calculator 535 may call a first adjustment factor relation RLSx corresponding to the first illuminance level ILLV1 from the illuminance level-adjustment factor table 537 and may calculate the adjustment factor ADJ_FCT by applying the first adjustment factor relation RLSx to the first dynamic range compression ratio DRC_R1. The illuminance level-adjustment factor table 537 may be stored in a memory, memory device, or the like of any device and/or system of any of the example embodiments, and the adjustment factor calculator 535 may call the first adjustment factor relation RLSx corresponding to the first illuminance level ILLV1 from the illuminance level-adjustment factor table 537 based on accessing the illuminance level-adjustment factor table 537 from the memory, memory device, or the like.

FIG. 9 is a diagram illustrating some example embodiments of an illuminance level-adjustment factor table of FIG. 8.

Referring to FIGS. 8 and 9, an illuminance level-adjustment factor table ILL_AF_Table may include a plurality of illuminance level sections IM_LV1, IM_LV2, IM_LV3, IM_LV4, and IM_LV5 and a plurality of relations RLS1, RLS2, RLS3, RLS4, and RLS5.

In some example embodiments, the plurality of illuminance level sections IM_LV1 to IM_LV5 may be defined by partitioning an illuminance level range capable of being expressed as an illuminance level of an image sensor. The plurality of relations RLS1, RLS2, RLS3, RLS4, and RLS5 may be defined to correspond to the plurality of illuminance level sections IM_LV1 to IM_LV5, respectively.

In some example embodiments, when the first illuminance level ILLV1 belongs to one (e.g., IM_LV1) of the plurality of illuminance level sections IM_LV1 to IM_LV5, the adjustment factor calculator 535 may call the corresponding relation (e.g., RLS1) as the first adjustment factor relation RLSx.

In some example embodiments, the plurality of illuminance level sections may include a first illuminance level section (e.g., IM_LV1) and a second illuminance level section (e.g., IM_LV2) indicating a higher illuminance level than the first illuminance level section. The plurality of relations RLS1 to RLS5 may include a first relation (e.g., RLS1) defined with respect to the first illuminance level section and a second relation (e.g., RLS2) defined with respect to the second illuminance level section. In the case of applying each of the first relation and the second relation to an arbitrary dynamic range compression ratio, the first relation may be defined to indicate a value greater than or equal to that of the second relation.

In some example embodiments, each of the plurality of relations RLS1 to RLS5 may include a square root term of the first dynamic range compression ratio DRC_R1. For example, IM_LV5 may indicate the highest illuminance level section, IM_LV1 may indicate the lowest illuminance level section, and IM_LV4, IM_LV3, and IM_LV2 may indicate illuminance level sections that sequentially decrease between IM_LV5 and IM_LV1. In this case, RLS5 may be "sqrt(DRC_R1)", each of RLS4 and RLS3 may be "((3+sqrt(DRC_R1))/4)", each of the RLS2 and RLS1 may be "((7+sqrt(DRC_R1))/8)". However, this is only an example. The illuminance level-adjustment factor table ILL_AF_Table may be stored in a memory, memory device, or the like of any device and/or system of any of the example embodiments, for example memory device 720 of computing device 700, and the adjustment factor calculator 535 may call a first adjustment factor relation RLSx corresponding to the first illuminance level ILLV1 from the illuminance level-adjustment factor table ILL_AF_Table based on accessing the illuminance level-adjustment factor table ILL_AF_Table from the memory, memory device, or the like.

Figure 10A:
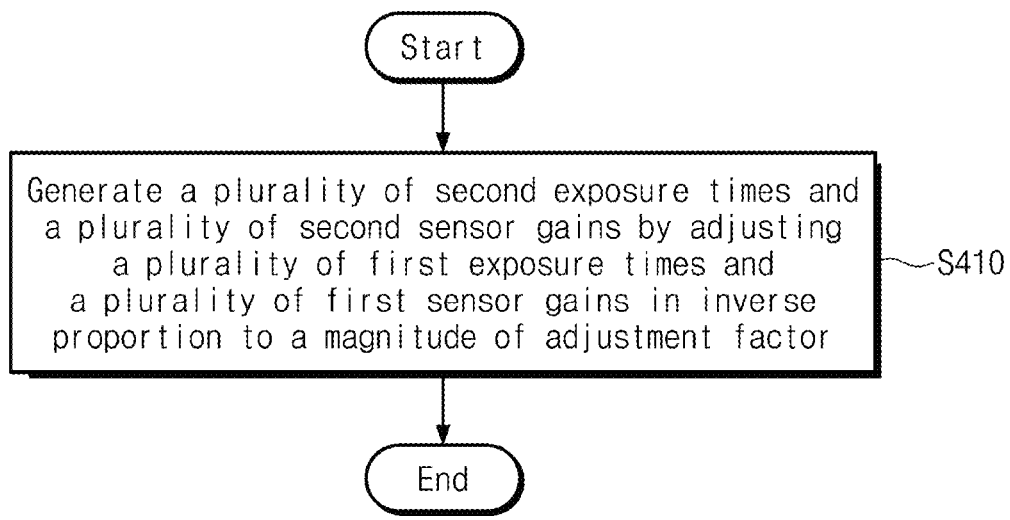
FIGS. 10A and 10B are diagrams illustrating some example embodiments of an operation of generating second parameters of FIG. 1.
Figure 10B:
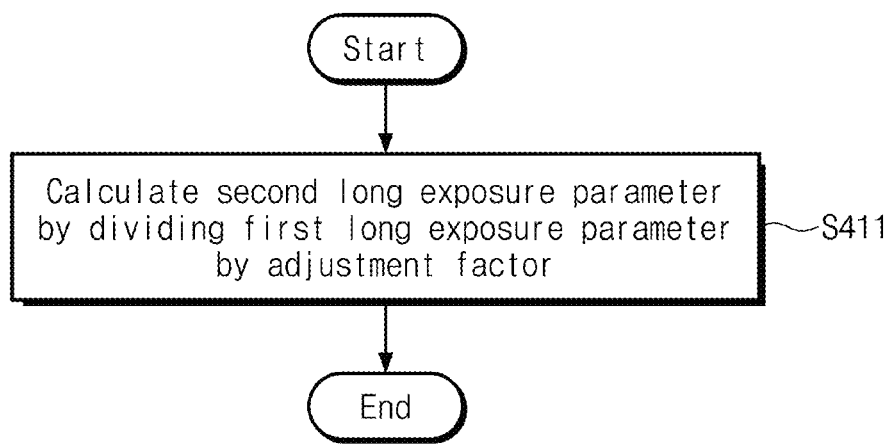

FIGS. 10A and 10B are diagrams illustrating some example embodiments of an operation of generating second parameters of FIG. 1.

Referring to FIGS. 1, 2, and 10A, in the generating of the second parameters PARAM2 (S400), the application processor 500 may generate the plurality of second exposure times ET2s and the plurality of second sensor gains SG2s by adjusting the plurality of first exposure times ET1s and the plurality of first sensor gains SG1s so as to be inversely proportional to the magnitude of the adjustment factor ADJ_FCT (S410).

In some example embodiments, the first parameters PARAM1 may further include the first long exposure parameter, the first medium exposure parameter, and the first short exposure parameter, and the second parameters PARAM2 may further include the second long exposure parameter, the second medium exposure parameter, and the second short exposure parameter. For example, each of the first long exposure parameter, the first medium exposure parameter, and the first short exposure parameter may be obtained by multiplying one of the plurality of first exposure times ET1s and one of the plurality of first sensor gains SG1s together. For example, each of the second long exposure parameter, the second medium exposure parameter, and the second short exposure parameter may be obtained by multiplying one of the plurality of second exposure times ET2s and one of the plurality of second sensor gains SG2s together.

Referring to FIGS. 1, 2, and 10B, in the generating of the second parameters PARAM2 (S400), the application processor 500 may calculate the second long exposure parameter by dividing the first long exposure parameter by the adjustment factor ADJ_FCT (S411).

Figure 11:
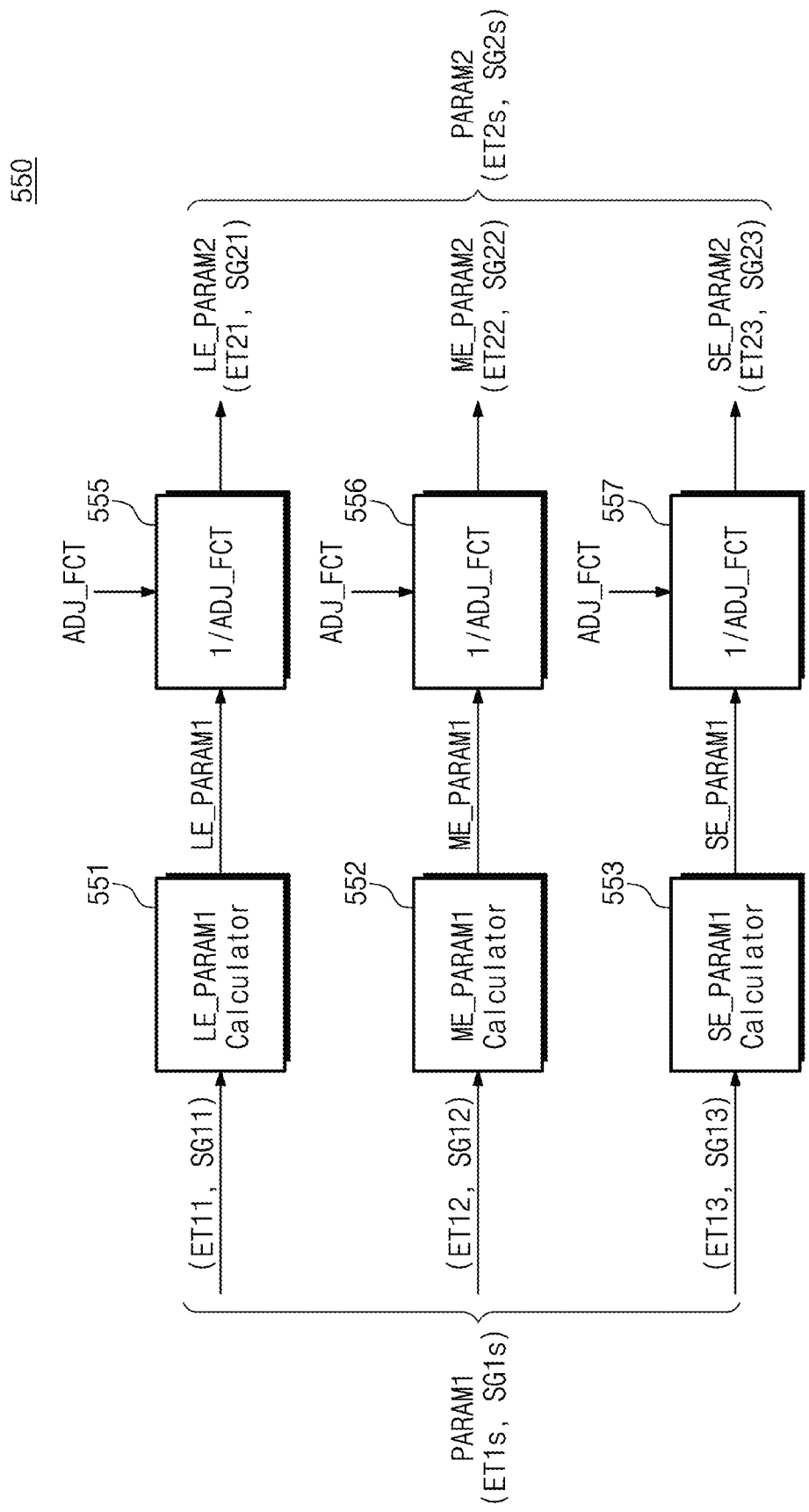
FIG. 11 is a block diagram illustrating some example embodiments of a second parameter generator of FIG. 2.

FIG. 11 is a block diagram illustrating some example embodiments of a second parameter generator of FIG. 2.

Referring to FIGS. 2 and 11, the second parameter generator 550 may include first parameter calculators 551, 552, and 553 and dividers 555, 556, and 557. The second parameter generator 550 may perform operation S410 and operation S411 of FIGS. 10A and 10B.

The first parameter calculators 551, 552, and 553 may calculate a first long exposure parameter LE_PARAM1, a first medium exposure parameter ME_PARAM1, and a first short exposure parameter SE_PARAM1 based on the plurality of first exposure times ET1s including the setting times ET11, ET12, and ET13 and the plurality of first sensor gains SG1s including the setting gains SG11, SG12, and SG13. For example, the first parameter calculator 551 may calculate the first long exposure parameter LE_PARAM1 by multiplying the setting time ET11 and the setting gain SG11 together, the first parameter calculator 552 may calculate the first medium exposure parameter ME_PARAM1 by multiplying the setting time ET12 and the setting gain SG12 together, and the first parameter calculator 553 may calculate the first short exposure parameter SE_PARAM1 by multiplying the setting time ET13 and the setting gain SG13 together.

The divider 555 may generate a second long exposure parameter LE_PARAM2 by dividing the first long exposure parameter LE_PARAM1 by the adjustment factor ADJ_FCT, the divider 556 may generate a second medium exposure parameter ME_PARAM2 by dividing the first medium exposure parameter ME_PARAM1 by the adjustment factor ADJ_FCT, and the divider 557 may generate a second short exposure parameter SE_PARAM2 by dividing the first short exposure parameter SE_PARAM1 by the adjustment factor ADJ_FCT.

Some example embodiments in which the parameters LE_PARAM1, ME_PARAM1, and SE_PARAM1 capable of being included in the first parameters PARAM1 are generated by the second parameter generator 550 is described with reference to FIG. 11, but the parameters LE_PARAM1, ME_PARAM1, and SE_PARAM1 may be generated by the first parameter generator 510 (refer to FIG. 2 or 4).

Figure 12:
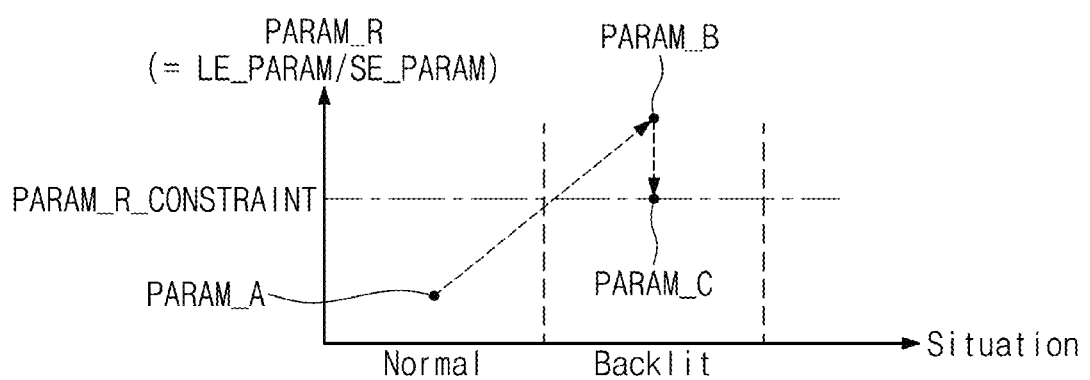
FIG. 12 is a diagram for describing a hardware constraint of an image sensor according to some example embodiments of the present inventive concepts.

FIG. 12 is a diagram for describing a hardware constraint of an image sensor according to some example embodiments of the present inventive concepts.

In FIG. 12, a horizontal axis represents an ambient environment of an image device, and a vertical axis represents a parameter ratio PARAM_R being a ratio of a long exposure parameter LE_PARAM to a short exposure parameter SE_PARAM.

Referring to FIGS. 11 and 12, when the ambient environment of the image device is the normal environment, the parameter ratio may be PARAM_A. However, when the ambient environment of the image device changes from the normal environment to the backlit environment, the parameter ratio may change to PARAM_B. However, due to a hardware constraint of an image sensor for obtaining HDR image data, the parameter ratio of the backlit environment may be constrained not to exceed PARAM_R_CONSTRAINT, and the parameter ratio is adjusted to decrease from PARAM_B to PARAM_C. In this case, the long exposure parameter LE_PARAM may have a maximum value, and the short exposure parameter SE_PARAM may increase to an unintended level to satisfy the parameter ratio. For example, each of an exposure time and/or a sensor gain included in the short exposure parameter SE_PARAM may increase to an unintended level or more.

Figure 13:
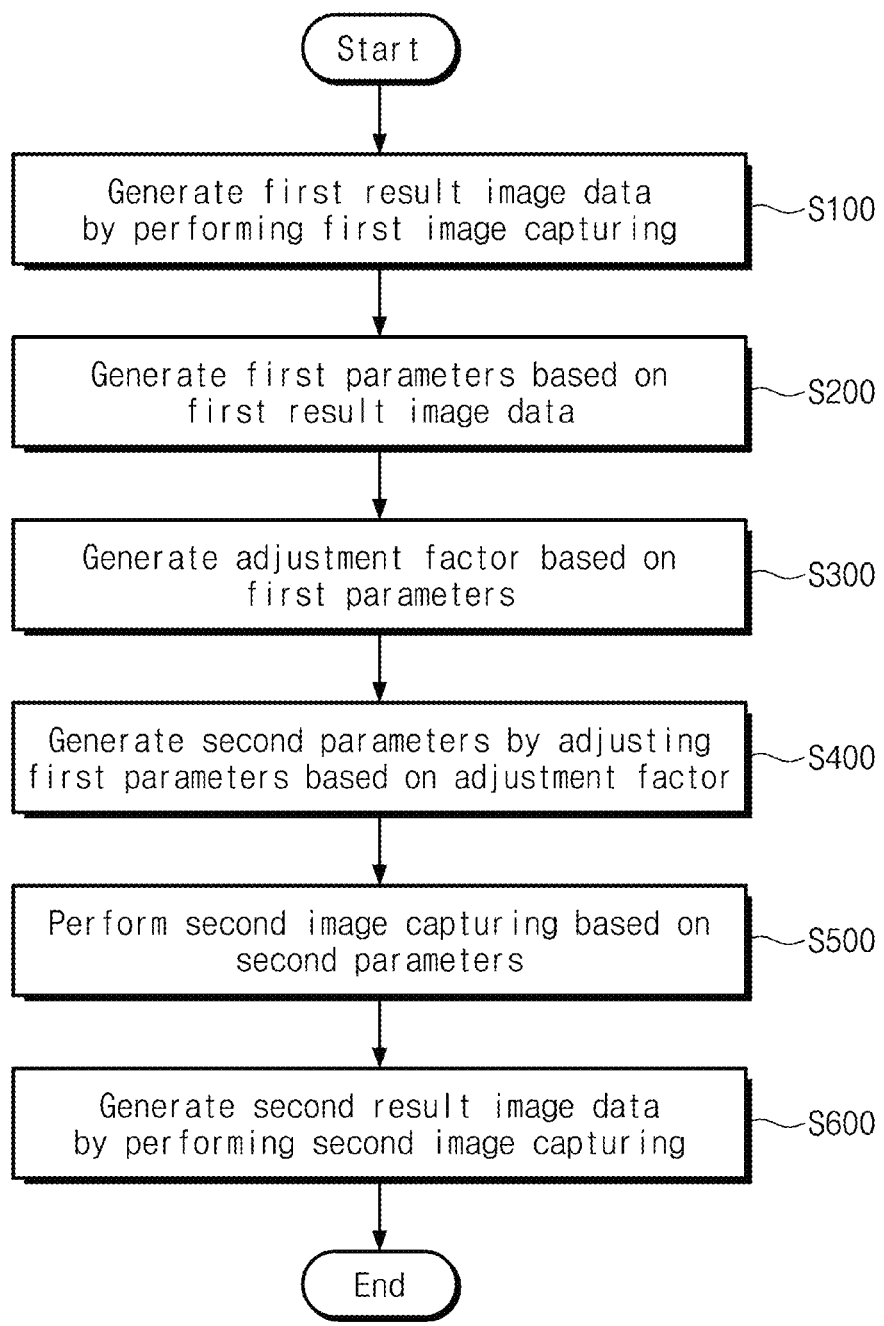
FIG. 13 is a flowchart illustrating an operating method of an image sensor according to some example embodiments of the present inventive concepts.

FIG. 13 is a flowchart illustrating an operating method of an image sensor according to some example embodiments of the present inventive concepts.

Referring to FIGS. 1, 2, and 13, in the operating method of the image sensor of FIG. 13, the image sensor 100 may further generate a plurality of second result image data (e.g., second images) by performing second image capturing (S600), compared to the operating method of the image sensor of FIG. 1. The description given with reference to the operating method of the image sensor of FIG. 1 will be omitted to avoid redundancy.

In some example embodiments, the second image capturing may be performed after the first image capturing.

In some example embodiments, the plurality of second result image data may include a plurality of second SDR image data and second HDR image data (e.g., a plurality of second SDR images and a plurality of second HDR images).

Figure 14:
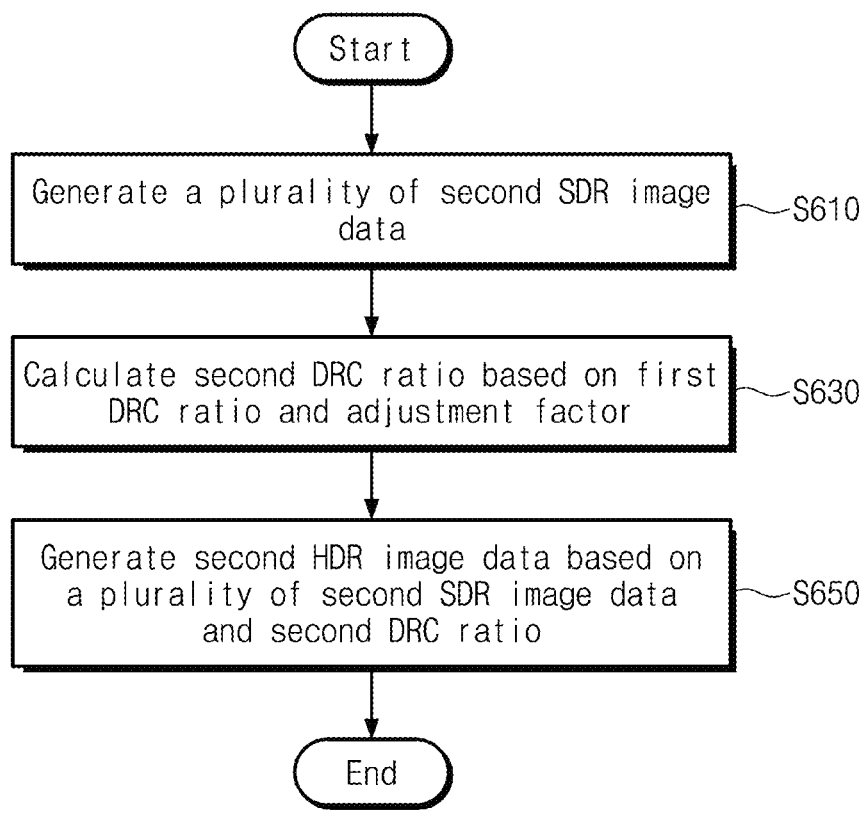
FIG. 14 is a flowchart illustrating some example embodiments of an operation of generating second result image data of FIG. 13.
Figure 15:
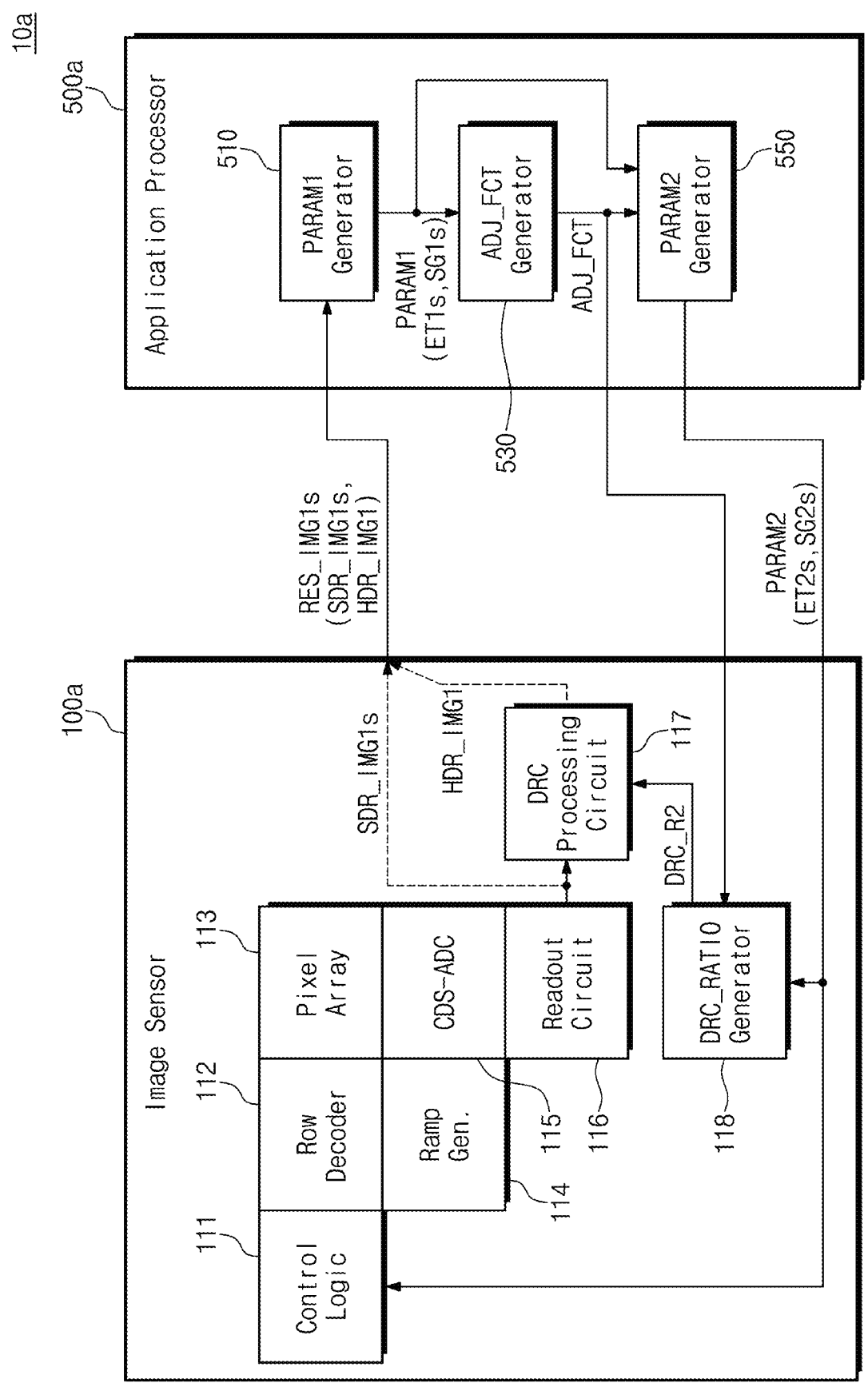
FIG. 15 is a block diagram illustrating an image device according to some example embodiments of the present inventive concepts.

FIG. 14 is a flowchart illustrating some example embodiments of an operation of generating second result image data of FIG. 13. FIG. 15 is a block diagram illustrating an image device according to some example embodiments of the present inventive concepts.

Referring to FIGS. 1, 2, 13, 14, and 15, an image device 10a may include an image sensor 100a and an application processor 500a.

The image sensor 100a may include control logic 111, a row decoder 112, a pixel array 113, a ramp generator 114, a CDS-ADC 115, a readout circuit 116, a dynamic range compression processing circuit 117, and a dynamic range compression ratio generator 118.

The application processor 500a may include the first parameter generator 510, the adjustment factor generator 530, and the second parameter generator 550.

In the generating of the second result image data (S600), the image sensor 100 may generate a plurality of second SDR image data (S610).

The dynamic range compression ratio generator 118 may calculate a second dynamic range compression ratio DRC_R2 based on the second parameters PARAM2 and the adjustment factor ADJ_FCT (S630).

In some example embodiments, the dynamic range compression ratio generator 118 may calculate the second dynamic range compression ratio DRC_R2 based on the first dynamic range compression ratio and the adjustment factor ADJ_FCT. The second parameters PARAM2 may include the plurality of second exposure times EP2s and the plurality of second sensor gains SG2s and may further include the second long exposure parameter and the second short exposure parameter. The second long exposure parameter may be obtained by dividing the first long exposure parameter by the adjustment factor ADJ_FCT, the second short exposure parameter may be obtained by dividing the first short exposure parameter by the adjustment factor ADJ_FCT, and the dynamic range compression ratio generator 118 may obtain the first dynamic range compression ratio, which is a value obtained by dividing the first long exposure parameter by the first short exposure parameter, by dividing the second long exposure parameter by the second short exposure parameter.

In some example embodiments, the second dynamic range compression ratio DRC_R2 may be obtained by multiplying the first dynamic range compression ratio and the adjustment factor ADJ_FCT together.

The dynamic range compression processing circuit 117 may generate second HDR image data (S650).

In some example embodiments, the dynamic range compression processing circuit 117 may generate the second HDR image data based on the plurality of second SDR image data and the second dynamic range compression ratio DRC_R2. For example, the dynamic range compression processing circuit 117 may perform the merging, segmentation, and tone mapping processes for generating the second HDR image data based on the second dynamic range compression ratio DRC_R2. SDR image data corresponding to the second long exposure parameter may be generated by applying the second dynamic range compression ratio DRC_R2 such that an average brightness value of SDR image data corresponding to the second long exposure parameter is equal or substantially equal to an average brightness value of SDR image data corresponding to the first long exposure parameter. The second HDR image data (e.g., second HDR images) may satisfy (e.g., conform to) the hardware constraints of the image sensor 100 for obtaining HDR image data. Thus, the second HDR image data (e.g., second HDR images) may have improved dynamic range (e.g., stabilized brightness of an object in the HDR images and prevention of saturation of the background in the HDR images). Thus, the second HDR image data (e.g., second HDR images) may have improved image quality. As a result, an image sensor and/or image device including same, performing an operating method according to some example embodiments such that the second image capturing is performed, may generate improved quality HDR images while accounting for (e.g., compensating for, accommodating, etc.) variations in the ambient environment (e.g., variations in ambient illuminance resulting from a sharp change of an ambient environment from normal to backlit) based on the second image capturing being performed based on second parameters including a plurality of second exposure times and a plurality of second sensor gains based on adjusting first parameters, which are generated based on first result image data and associated with the first image capturing and include a plurality of first exposure times and a plurality of first sensor gains, based on the adjustment factor.

Figure 16:
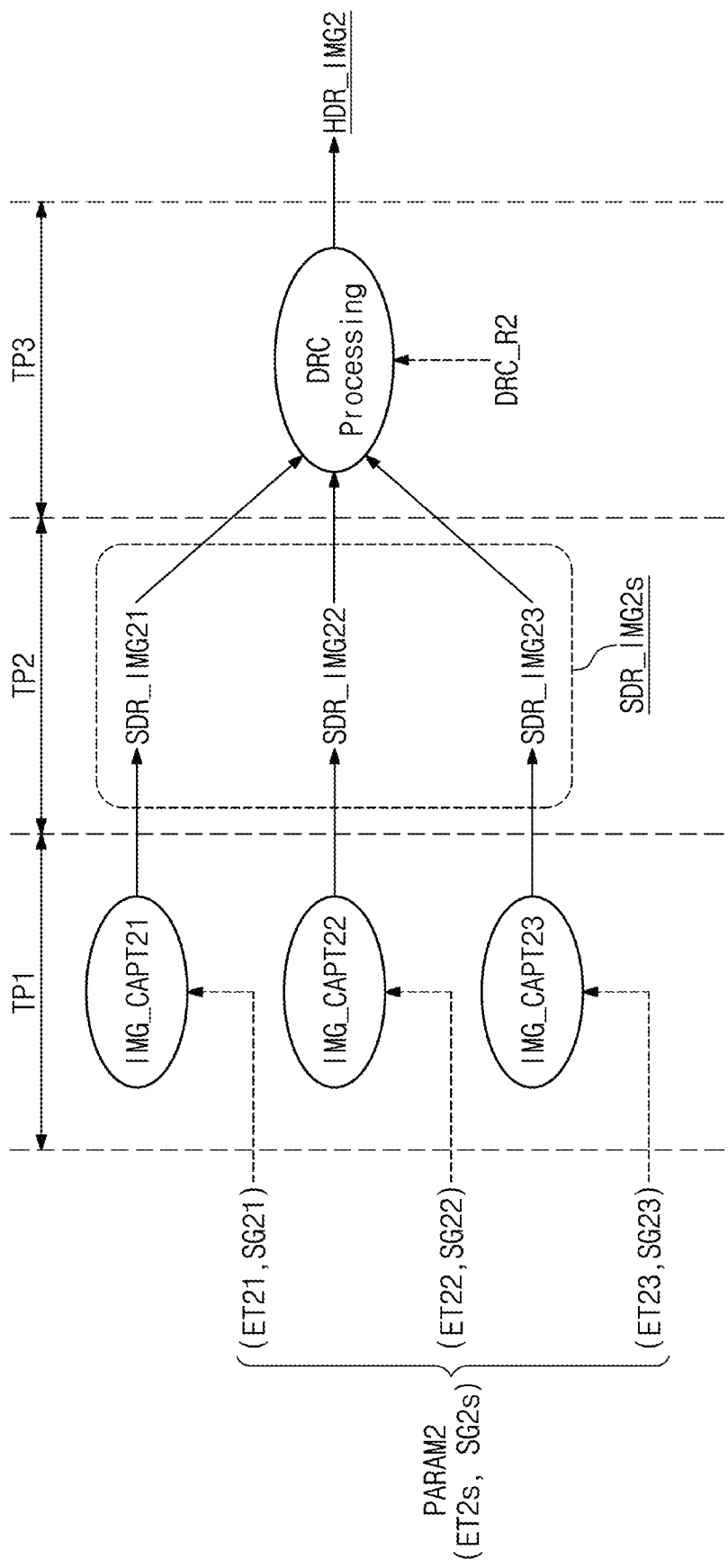
FIG. 16 is a diagram for describing operations of an image sensor according to some example embodiments of the present inventive concepts.

FIG. 16 is a diagram for describing operations of an image sensor according to some example embodiments of the present inventive concepts.

Referring to FIGS. 15 and 16, the image device 10*a* may operate in time periods TP1, TP2, and TP3 that are sequentially progressed.

During the first time period TP1, the image device 10*a* may perform second image capturing IMG_CAPT21, IMG_CAPT22, and IMG_CAPT23 based on the second parameters PARAM2.

In some example embodiments, the second parameters PARAM2 may include the plurality of second exposure times EP2*s*, may include the plurality of second sensor gains SG2*s*, the plurality of second exposure times EP2*s* may include the setting times EP21, EP22, and EP23, and the plurality of second sensor gains SG2*s* may include the setting gains SG21, SG22, and SG23. The second parameters PARAM2 may further include the second long exposure parameter, the second medium exposure parameter, and the second short exposure parameter. The second long exposure parameter may have a value obtained by multiplying the setting time EP21 and the setting gain SG21 together, the second medium exposure parameter may have a value obtained by multiplying the setting time EP22 and the setting gain SG22 together, and the second short exposure parameter may have a value obtained by multiplying the setting time EP23 and the setting gain SG23 together.

During the second time period TP2, the image device 10*a* may read out a plurality of second SDR image data SDR_IMG2*s*.

In some example embodiments, the plurality of second SDR image data SDR_IMG2*s* may include SDR image data SDR_IMG21, SDR_IMG22, and SDR_IMG23. The image device 10*a* may generate the SDR image data SDR_IMG21 based on the second long exposure parameter, may generate the SDR image data SDR_IMG22 based on the second medium exposure parameter, and may generate the SDR image data SDR_IMG23 based on the second short exposure parameter.

During the third time period TP3, the image device 10*a* may generate second HDR image data HDR_IMG2 by performing dynamic range compression processing.

In some example embodiments, the image device 10*a* may perform the dynamic range compression processing based on the second dynamic range compression ratio DRC_R2.

FIGS. 17A, 17B, 18A, 18B, 19A, and 19B are diagrams for describing first parameters, second parameters, a first dynamic range compression ratio, and a second dynamic range compression ratio of FIG. 1 according to some example embodiments of the present inventive concepts.

FIGS. 17A and 17B show the first parameters, the second parameters, the first dynamic range compression ratio, and the second dynamic range compression ratio in a high-illuminance environment, FIGS. 18A and 18B show the first parameters, the second parameters, the first dynamic range compression ratio, and the second dynamic range compression ratio in a medium-illuminance environment, and FIGS. 19A and 19B show the first parameters, the second parameters, the first dynamic range compression ratio, and the second dynamic range compression ratio in a low-illuminance environment.

In some example embodiments, the relations RLS1 to RLS5 described with reference to FIG. 9 may be used to calculate the first and second parameters and the first and second dynamic range compression ratios. For example, the RLS5 may be used in FIGS. 17A and 17B, one of the RLS4 and the RLS5 may be used in FIGS. 18A and 18B, and one of the RLS2 and the RLS1 may be used in FIGS. 19A and 19B.

Figure 20:
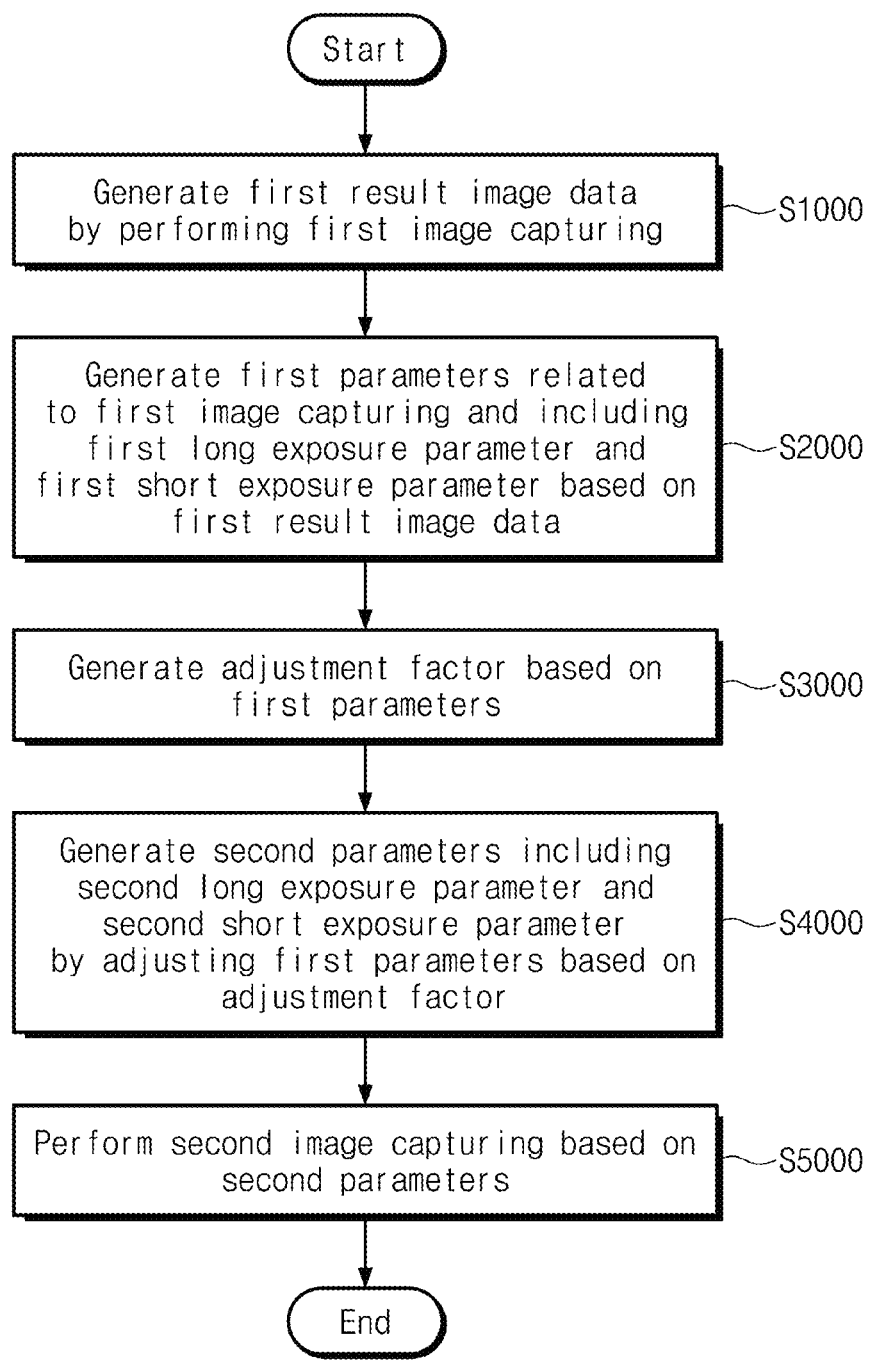
FIG. 20 is a flowchart illustrating an operating method of an image sensor according to some example embodiments of the present inventive concepts.

FIG. 20 is a flowchart illustrating an operating method of an image sensor according to some example embodiments of the present inventive concepts.

Referring to FIGS. 2, 15, and 20, the image sensor 100/100*a* may generate first result image data including a plurality of first SDR image data and first HDR image data by performing first image capturing (S1000).

The application processor 500/500*a* may generate first parameters based on the first result image data (S2000).

In some example embodiments, the first parameters may be associated with the first image capturing and may include a first long exposure parameter and a first short exposure parameter.

The application processor 500/500*a* may generate an adjustment factor based on the first parameters (S3000).

The application processor 500/500*a* may generate second parameters by adjusting the first parameters based on the adjustment factor (S4000).

In some example embodiments, the second parameters may include a second long exposure parameter and a second short exposure parameter.

The image sensor 100/100*a* may perform second image capturing based on the second parameters (S5000).

In some example embodiments, a ratio of the second long exposure parameter to the second short exposure parameter may be calculated to satisfy a hardware constraint of an image sensor for obtaining HDR image data.

Figure 21:
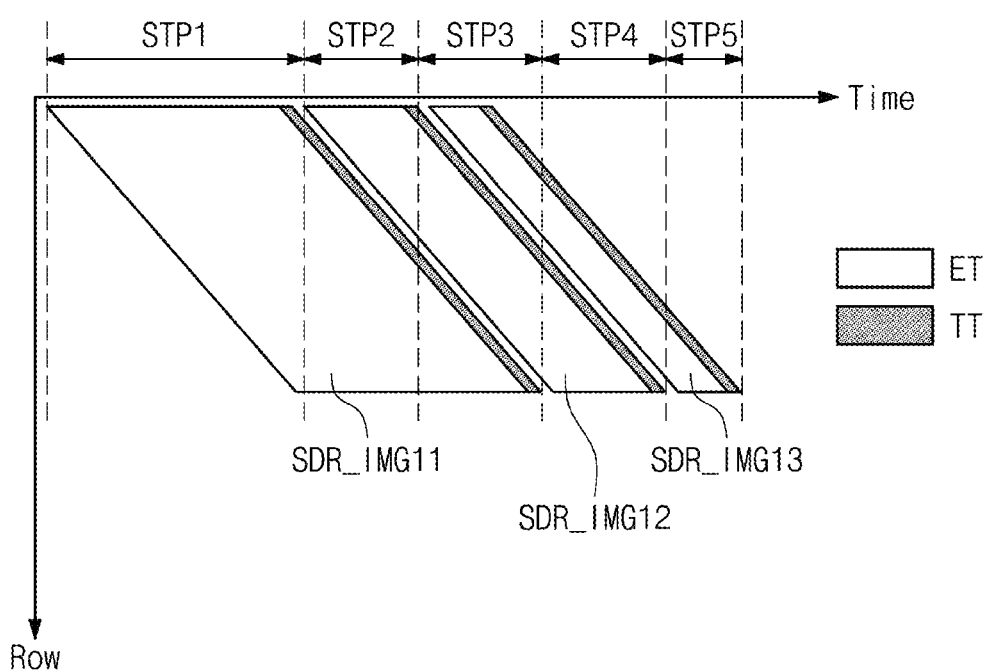
FIG. 21 is a diagram for describing an example of a manner in which image sensors of FIGS. 2 and 15 operate according to some example embodiments of the present inventive concepts.

FIG. 21 is a diagram for describing an example of a manner in which image sensors of FIGS. 2 and 15 operate according to some example embodiments of the present inventive concepts.

In FIG. 21, a horizontal axis represents a time, and a vertical axis represents a row (or a line) of a pixel array. A pixel array of the image sensor 100/100a may output the SDR image data SDR_IMG11, SDR_IMG12, and SDR_IMG13 respectively corresponding to different exposure times in time periods STP1, STP2, STP3, STP4, and STP5 that are sequentially progressed. In FIG. 21, ET indicates a time (e.g., an exposure time) during which photoelectric conversion elements of the pixel array accumulate photoelectrons, and TT indicates a transfer time during which the SDR image data SDR_IMG11, SDR_IMG12, and SDR_IMG13 are output through a read-out circuit.

Referring to FIG. 21, during the first time period STP1, photoelectrons for the SDR image data SDR_IMG11 may be accumulated, and a portion of the SDR image data SDR_IMG11 may be output. During the second time period STP2, photoelectrons for the SDR image data SDR_IMG11 and SDR_IMG12 may be accumulated, and another portion of the SDR image data SDR_IMG11 and a portion of the SDR image data SDR_IMG12 may be output. During the third time period STP3, photoelectrons for the SDR image data SDR_IMG11, SDR_IMG12, and SDR_IMG13 may be accumulated, and the other portion of the SDR image data SDR_IMG11, another portion of the SDR image data SDR_IMG12, and a portion of the SDR image data SDR_IMG13 may be output. During the fourth time period STP4, photoelectrons for the SDR image data SDR_IMG12 and SDR_IMG13 may be accumulated, and the other portion of the SDR image data SDR_IMG12 and another portion of the SDR image data SDR_IMG13 may be output. During the fifth time period STP5, photoelectrons for the SDR image data SDR_IMG13 may be accumulated, and the other portion of the SDR image data SDR_IMG13 may be output. As such, a manner in which some or all of a plurality of SDR image data respectively corresponding to different exposure times are simultaneously output during a specific time period is referred to as a "staggered manner". In this case, referring to FIGS. 2 and 15, HDR image data may be generated by the application processor 500/500a, not the image sensor 100/100a; the adjustment factor ADJ_FCT may be used as an internal signal of the application processor 500/500a without being transferred to the image sensor 100/100a.

Figure 22:
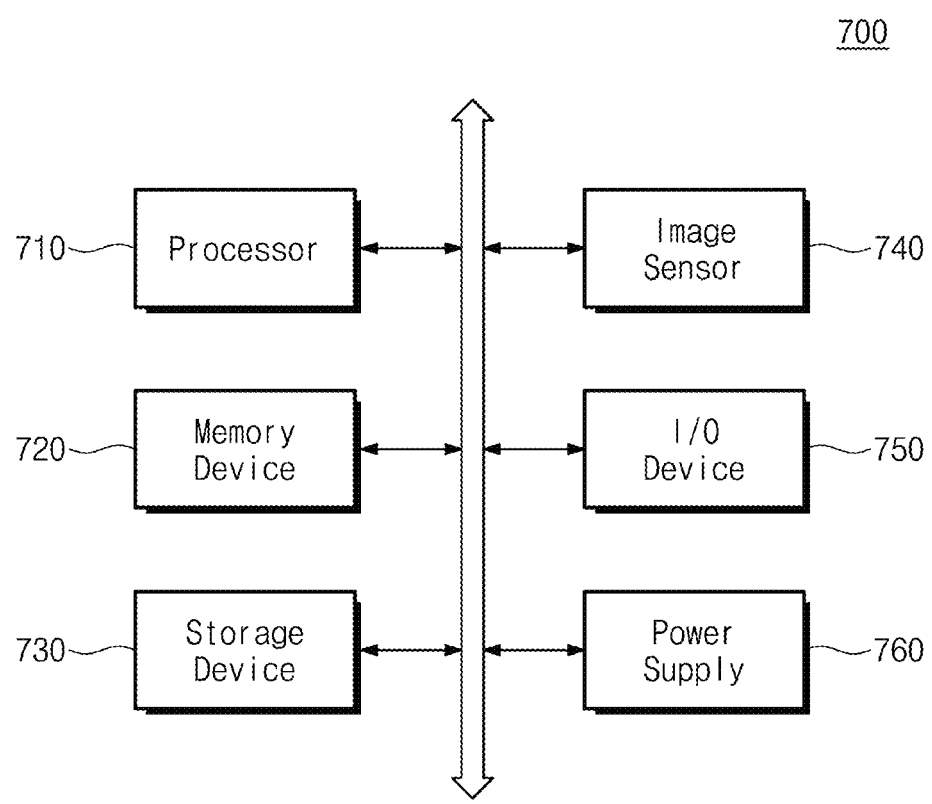
FIG. 22 is a block diagram illustrating a computing system including an image sensor according to some example embodiments of the present inventive concepts.

FIG. 22 is a block diagram illustrating a computing system including an image sensor according to some example embodiments of the present inventive concepts.

Referring to FIG. 22, a computing system 700 may include a processor 710, a memory device 720, a storage device 730, an image sensor 740, an input/output device 750, and a power supply 760. Although not illustrated in FIG. 22, the computing system 700 may communicate with a video card, a sound card, a memory card, a USB device, etc. or may further include ports capable of communicating with any other electronic devices.

The processor 710 may perform specific calculations or tasks. In some example embodiments, the processor 710 may be a micro-processor or a central processing unit (CPU).

The processor 710 may communicate with the memory device 720, the storage device 730, the image sensor 740, and the input/output device 750 through an address bus, a control bus, and a data bus.

In some example embodiments, the processor 710 may also be connected to an expansion bus such as a peripheral component interconnect (PCI) bus.

The memory device 720 may store data for an operation of the computing system 700. For example, the memory device 720 may be implemented with a dynamic RAM (DRAM), a mobile DRAM, a static RAM (SRAM), a phase change RAM (PRAM), a ferroelectric RAM (FRAM), a resistive RAM (RRAM), and/or a magnetoresistive RAM (MRAM).

The storage device 730 may include a solid state drive (SSD), a hard disk drive (HDD), a CD-ROM, etc. The input/output device 750 may include input devices such as a keyboard, a keypad, and a mouse and output devices such as a printer and a display. The power supply 760 may supply an operating voltage necessary for the operation of the computing system 700.

The image sensor 740 may be connected to the processor 710 through the buses or any other communication link and may perform communication. The image sensor 740 may correspond to the image sensor 100 described with reference to FIG. 2 or the image sensor 100a described with reference to FIG. 15. In some example embodiments, the computing device 700 may correspond to the image device 10 described with reference to FIG. 2 or the image device 10a described with reference to FIG. 15. The computing device 700 may be configured to perform any of the operation methods or any portions thereof, and/or any operations thereof, according to any of the example embodiments.

Figure 23:
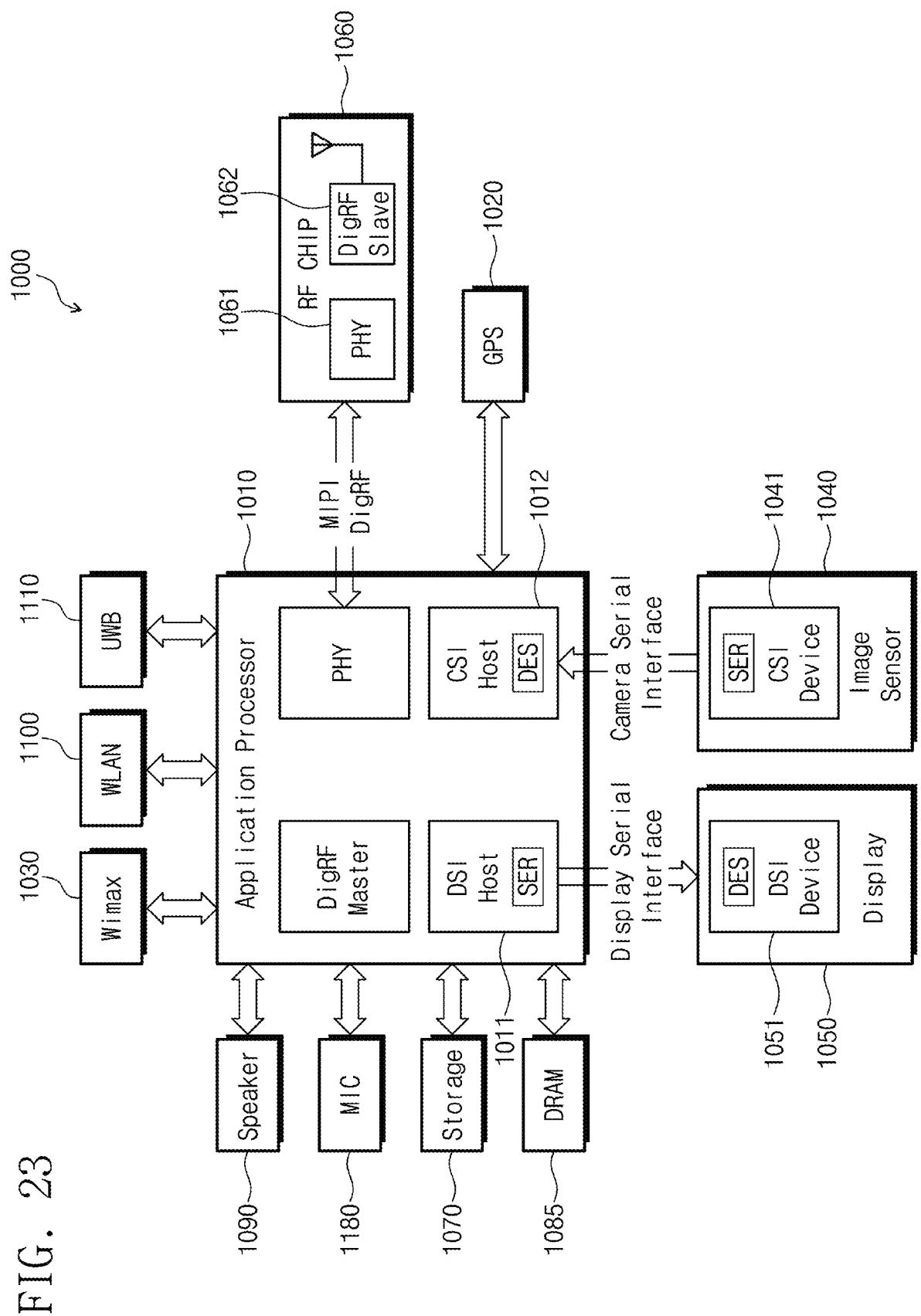
FIG. 23 is a block diagram illustrating an electronic system including an image sensor according to some example embodiments of the present inventive concepts.

FIG. 23 is a block diagram illustrating an electronic system including an image sensor according to some example embodiments of the present inventive concepts.

Referring to FIG. 23, an electronic system 1000 may be implemented with a data processing device capable of using or supporting an MIPI interface and may include an application processor 1010, an image sensor 1040, a display 1050, etc. The electronic system 1000 may further include an RF chip 1060, a GPS 1020, storage 1070, a microphone 1080, a DRAM 1085, and a speaker 1090 and may perform communication by using a UWB 1110, a WLAN 1100, a WIMAX 1030, etc.

The application processor 1010 may refer to a controller or a processor that controls operations of the image sensor 1040 and the display 1050.

The application processor 1010 may include a DSI host 1011 communicating with a DSI device 1051 of the display 1050, a CSI host 1012 communicating with a CSI device 1041 of the image sensor 1040, a PHY exchanging data with a PHY 1061 of the RF chip 1060 in compliance with DigRF, and a DigRF master controlling a DigRF slave 1062 of the RF chip 1060.

In some example embodiments, the DSI host 1011 may include an optical serializer SER, and the DSI device 1051 may include an optical deserializer DES. In some example embodiments, the CSI host 1012 may include an optical deserializer DES, and the CSI device 1041 may include an optical serializer SER.

The image sensor 1040 may be the image sensor according to some example embodiments of the present inventive concepts and may operate based on the operating method according to some example embodiments of the present inventive concepts. In some example embodiments, the electronic system 1000 may correspond to the image device 10 described with reference to FIG. 2 or the image device 10a described with reference to FIG. 15. The electronic system 1000 may be configured to perform any of the operation methods or any portions thereof, and/or any operations thereof, according to any of the example embodiments.

In some example embodiments, the electronic system 1000 may be an electronic system such as a personal computer (PC), a workstation, a laptop, a cellular phone, a smart phone, an MP3 player, a PDA (Personal Digital Assistant), a PMP (Portable Multimedia Player), a digital TV, a digital camera, a portable game console, a navigation system, a wearable device, an IoT (Internet of Things) device, an IoE (Internet of Everything) device, an e-book, a VR (Virtual Reality) device, an AR (Augmented Reality) device, or a drone.

As described herein, any devices, systems, units, circuits, controllers, processors, and/or portions thereof according to any of the example embodiments (including, for example, the image device 10, the image sensor 100, the pixel array 101, the application processor 500, the first parameter generator 510, the first setting time and setting gain calculator 511, the second setting time and setting gain calculator 513, the third setting time and setting gain calculator 515, the adjustment factor generator 530, the dynamic range compression ratio calculator 531, the illuminance level calculator 533, the adjustment factor calculator 535, the illuminance level-adjustment factor table 537, the second parameter generator 550, the first parameter calculator 551, the first parameter calculator 552, the first parameter calculator 553, the divider 555, the divider 556, the divider 557, the image device 10a, the image sensor 100a, the control logic 111, the row decoder 112, the pixel array 113, the ramp generator 114, the CDS-ADC 115, the readout circuit 116, the dynamic range compression processing circuit 117, the dynamic range compression ratio generator 118, the application processor 500a, the computing system 700, the processor 710, the memory device 720, the storage device 730, the image sensor 740, the input/output device 750, the power supply 760, the electronic system 1000, the application processor 1010, the image sensor 1040, the display 1050, the RF chip 1060, the GPS 1020, the storage 1070, the microphone 1080, the DRAM 1085, the speaker 1090, the UWB 1110, the WLAN 1100, the WIMAX 1030, the DSI host 1011, the CSI host 1012, the DSI device 1051, the CSI device 1041, the PHY of the application processor 1010, the DigRF master of the application processor 1010, the PHY 1061, the DigRF slave 1062, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, units, circuits, controllers, processors, and/or portions thereof according to any of the example embodiments.

As described above, in the operating method of the image sensor according to some example embodiments of the present inventive concepts, second image capturing may be performed based on results of performing first image capturing. First parameters may be generated based on the results of performing the first image capturing, and second parameters for performing the second image capturing may be generated based on the first parameters. The second parameters may be calculated to satisfy the hardware constraint of the image device (or image sensor) for obtaining the HDR image data, and the second image capturing may be performed, to capture (e.g., generate) a second image based on the second parameters. Accordingly, even though the ambient environment changes from the normal environment to the backlit environment, the image device may obtain the HDR image data with the sufficient dynamic range by stabilizing a brightness value of an object and preventing a saturation of a background.

While the present inventive concepts have been described with reference to some example embodiments thereof, it will be apparent to those of ordinary skill in the art that various changes and modifications may be made thereto without departing from the spirit and scope of the present inventive concepts as set forth in the following claims.

What is claimed is:

1. An operating method of an image sensor, the operating method comprising:
generating first result image data including a plurality of first standard dynamic range (SDR) image data and first high dynamic range (HDR) image data based on performing first image capturing;
generating first parameters, which are associated with the first image capturing and include a plurality of first exposure times and a plurality of first sensor gains, based on the first result image data;
generating an adjustment factor based on the first parameters;
generating second parameters including a plurality of second exposure times and a plurality of second sensor gains based on adjusting the first parameters based on the adjustment factor; and
performing second image capturing based on the second parameters.

2. The operating method of claim 1, wherein the generating of the second parameters includes:
generating the plurality of second exposure times and the plurality of second sensor gains based on adjusting the plurality of first exposure times and the plurality of first sensor gains to be inversely proportional to the adjustment factor.

3. The operating method of claim 1, wherein the generating of the adjustment factor includes:
calculating a first dynamic range compression ratio based on
a first setting time and a second setting time among the plurality of first exposure times, and
a first setting gain and a second setting gain among the plurality of first sensor gains;
calculating a first illuminance level based on the first setting time and the first setting gain; and
calculating the adjustment factor based on the first dynamic range compression ratio, the first illuminance level, and a first adjustment factor relation.

4. The operating method of claim 3, wherein
the first setting time corresponds to an exposure time that is a longest exposure time among the plurality of first exposure times, the second setting time corresponds to another exposure time that is a shortest exposure time among the plurality of first exposure times, the first setting gain corresponds to the first setting time, and the second setting gain corresponds to the second setting time.

5. The operating method of claim 4, wherein the first dynamic range compression ratio is a value obtained based on dividing a first value by a second value, the first value obtained based on multiplying the first setting time and the first setting gain together, the second value obtained based on multiplying the second setting time and the second setting gain together.

6. The operating method of claim 5, wherein a magnitude of the adjustment factor increases as the first dynamic range compression ratio increases.

7. The operating method of claim 3, wherein the calculating of the adjustment factor includes:

calling the first adjustment factor relation corresponding to the first illuminance level, based on an illuminance level-adjustment factor table; and calculating the adjustment factor based on applying the first adjustment factor relation to the first dynamic range compression ratio.

8. The operating method of claim 7, wherein the illuminance level-adjustment factor table includes:

a plurality of illuminance level sections defined based on partitioning an illuminance level range capable of being expressed as an illuminance level of the image sensor; and a plurality of relations respectively defined with respect to the plurality of illuminance level sections.

9. The operating method of claim 8, wherein the plurality of illuminance level sections include a first illuminance level section and a second illuminance level section, the second illuminance level section indicating a higher illuminance level than the first illuminance level section, the plurality of relations include a first relation defined with respect to the first illuminance level section and a second relation defined with respect to the second illuminance level section, and when each of the first relation and the second relation is applied to the first dynamic range compression ratio, a value indicated by the first relation is greater than a value indicated by the second relation.

10. The operating method of claim 8, wherein each relation of the plurality of relations includes a square root term of a dynamic range compression ratio.

11. The operating method of claim 1, wherein the first parameters include a first long exposure parameter obtained by multiplying one of the plurality of first exposure times and one of the plurality of first sensor gains together, the second parameters include a second long exposure parameter obtained by multiplying one of the plurality of second exposure times and one of the plurality of second sensor gains together, and the generating of the second parameters includes:

calculating the second long exposure parameter based on dividing the first long exposure parameter by the adjustment factor.

12. The operating method of claim 1, further comprising:

generating second result image data including a plurality of second SDR image data and second HDR image data based on performing the second image capturing.

13. The operating method of claim 12, wherein the generating of the second result image data includes:

generating the plurality of second SDR image data;

calculating a second dynamic range compression ratio based on a first dynamic range compression ratio and the adjustment factor; and generating the second HDR image data based on the plurality of second SDR image data and the second dynamic range compression ratio.

14. The operating method of claim 13, wherein the second dynamic range compression ratio has a value obtained based on multiplying the first dynamic range compression ratio and the adjustment factor together.

15. An image device, comprising:

an application processor configured to generate first parameters, which are associated with first image capturing and include a plurality of first exposure times and a plurality of first sensor gains, based on first result image data including a plurality of first standard dynamic range (SDR) image data and first high dynamic range (HDR) image data, generate an adjustment factor based on the first parameters, and generate second parameters including a plurality of second exposure times and a plurality of second sensor gains based on adjusting the first parameters based on the adjustment factor; and an image sensor configured to perform the first image capturing, and perform second image capturing based on the second parameters.

16. The image device of claim 15, wherein the application processor is configured to:

generate the plurality of second exposure times and the plurality of second sensor gains based on adjusting the plurality of first exposure times and the plurality of first sensor gains to be inversely proportional to the adjustment factor.

17. The image device of claim 15, wherein the application processor is configured to:

calculate a first dynamic range compression ratio based on a first setting time and a second setting time among the plurality of first exposure times and a first setting gain and a second setting gain among the plurality of first sensor gains;

calculate a first illuminance level based on the first setting time and the first setting gain; and calculate the adjustment factor based on the first dynamic range compression ratio, the first illuminance level, and a first adjustment factor relation.

18. The image device of claim 17, wherein the first dynamic range compression ratio is a value obtained based on dividing a first value by a second value, the first value obtained based on multiplying the first setting time and the first setting gain together, the second value obtained based on multiplying the second setting time and the second setting gain together.

19. The image device of claim 17, wherein the application processor is configured to:

call the first adjustment factor relation corresponding to the first illuminance level based on an illuminance level-adjustment factor table; and calculate the adjustment factor based on applying the first adjustment factor relation to the first dynamic range compression ratio.

20. An operating method of an image sensor, the operating method comprising:

generating first result image data including a plurality of first standard dynamic range (SDR) image data and first high dynamic range (HDR) image data based on performing first image capturing;

generating first parameters, which are associated with the first image capturing and include a first long exposure parameter and a first short exposure parameter, based on the first result image data;

generating an adjustment factor based on the first parameters;

generating second parameters including a second long exposure parameter and a second short exposure parameter based on adjusting the first parameters based on the adjustment factor; and performing second image capturing based on the second parameters, wherein a ratio of the second long exposure parameter to the second short exposure parameter is calculated to satisfy a hardware constraint of the image sensor for obtaining HDR image data.

* * * * *